United States Patent
England et al.

(10) Patent No.: US 7,203,310 B2
(45) Date of Patent: Apr. 10, 2007

(54) METHODS AND SYSTEMS FOR CRYPTOGRAPHICALLY PROTECTING SECURE CONTENT

(75) Inventors: Paul England, Bellevue, WA (US); Marcus Peinado, Bellevue, WA (US); Nicholas P. Wilt, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 845 days.

(21) Appl. No.: 10/124,922

(22) Filed: Apr. 18, 2002

(65) Prior Publication Data

US 2003/0140241 A1   Jul. 24, 2003

Related U.S. Application Data

(60) Provisional application No. 60/337,617, filed on Dec. 4, 2001, provisional application No. 60/339,143, filed on Dec. 10, 2001.

(51) Int. Cl.
*H04N 7/167* (2006.01)
(52) U.S. Cl. ..................................... 380/200; 713/153
(58) Field of Classification Search ................ 380/210, 380/200; 713/153; 711/2
See application file for complete search history.

(56) References Cited

U.S. PATENT DOCUMENTS

| | | | | |
|---|---|---|---|---|
| 5,175,830 A | * | 12/1992 | Sherman et al. ................ 711/2 |
| 5,825,879 A | * | 10/1998 | Davis .......................... 380/216 |
| 5,898,779 A | * | 4/1999 | Squilla et al. ............... 713/176 |
| 6,101,276 A | * | 8/2000 | Adiletta et al. ............. 382/236 |
| 6,138,119 A | | 10/2000 | Hall et al. ...................... 707/9 |
| 6,167,136 A | * | 12/2000 | Chou ........................... 380/201 |
| 6,289,455 B1 | | 9/2001 | Kocher et al. .............. 713/194 |
| 6,330,624 B1 | | 12/2001 | Cromer et al. ................ 710/37 |
| 6,454,653 B1 | | 9/2002 | Kawazu ........................ 463/43 |
| 6,704,868 B1 | * | 3/2004 | Challener et al. ........... 713/168 |
| 6,957,340 B1 | * | 10/2005 | Pang et al. .................. 713/189 |
| 6,965,993 B2 | * | 11/2005 | Baker .......................... 713/153 |
| 2002/0126846 A1 | | 9/2002 | Multerer et al. ............ 380/251 |
| 2002/0136408 A1 | | 9/2002 | Garcia ........................ 380/259 |
| 2002/0150248 A1 | * | 10/2002 | Kovacevic ................... 380/210 |

(Continued)

FOREIGN PATENT DOCUMENTS

EP      0 410 777 A2     1/1991

(Continued)

OTHER PUBLICATIONS

Carravetta, P., "Interface for Video Monitor," *Revista Telegrafica Electronica*, 1985, 73(860), 188-182.

(Continued)

*Primary Examiner*—Emmanuel L. Moise
*Assistant Examiner*—Ali Abyaneh
(74) *Attorney, Agent, or Firm*—Woodcock Washburn LLP

(57) ABSTRACT

Methods and systems are provided for cryptographically protecting secure content in connection with a graphics subsystem of a computing device. Techniques are implemented to encrypt the contents of video memory so that unauthorized software cannot gain meaningful access to it, thereby maintaining confidentiality. Moreover, a mechanism for tamper detection is provided so that there is awareness when data has been altered in some fashion, thereby maintaining integrity. In various embodiments, the contents of overlay surfaces and/or command buffers are encrypted, and/or the GPU is able to operate on encrypted content while preventing its availability to untrusted parties, devices or software.

54 Claims, 15 Drawing Sheets

U.S. PATENT DOCUMENTS

2002/0163522 A1 11/2002 Porter et al. .............. 345/533
2003/0079222 A1* 4/2003 Boykin et al. ............. 725/31
2004/0202328 A1* 10/2004 Hara ......................... 380/270

FOREIGN PATENT DOCUMENTS

EP          1 133 190 A1     9/2001

OTHER PUBLICATIONS

Einon, G., "Display Adaptors (Buyer's Guide)," *PC User*, 1987, 58, 96-97, 100, 104-105, and 108-109.

Fogg, L., "A Hercules Primer: Black Sheep Graphics," *Micro. Cornucopia*, 1998, 39, 24-29.

Kitson, F.L., "A Tour of Computer Graphics Algorithms and Architectures," *Algorithms and Parallel VLSI Architectures*. Lectures and Tutorials Presented at the International Workshop, Deprettere, F. et al. (eds.), Pont-a-Mousson, France, Jun. 10-16, 1990, vol. A, 461-475.

Nair, Ajith N.; "Interactive Television Settop Terminal Architectures"; *Digest of Papers of Compcon (Computer Society Conference) 1996 Technologies for the Information Superhighway, Santa Clara, California,* Feb. 25-28, 1996; IEEE Comp. Soc. Press; vol. Conf. 41; 1996; pp. 233-238.

Yialelis, N., et al., "A security framework supporting domain-based access control in distribution systems," *IEEE*, 1996, 26-39.

* cited by examiner

Height | $Y_0$ | $U_0$ | $Y_1$ | $V_0$ | ... | $Y_{width-2}$ | $U_{width/2-1}$ | $Y_{width-1}$ | $V_{width/2-1}$ |

FIG. 6A

| $Y_0$ | $U_0$ | $Y_1$ | $V_0$ | $Y_4$ | $U_4$ | $Y_5$ | $V_2$ | $Y_8$ | $U_8$ | $Y_9$ | $V_8$ | $Y_c$ | $U_c$ | $Y_d$ | $V_c$ |
| $Y_2$ | $U_2$ | $Y_3$ | $V_2$ | $Y_6$ | $U_6$ | $Y_7$ | $V_6$ | $Y_a$ | $U_a$ | $Y_b$ | $V_a$ | $Y_e$ | $U_e$ | $Y_f$ | $V_e$ |

FIG. 6B

METHODS AND SYSTEMS FOR CRYPTOGRAPHICALLY PROTECTING SECURE CONTENT

CROSS-REFERENCE TO RELATED APPLICATIONS

This application claims the benefit of provisional application Ser. Nos. 60/337,617 filed Dec. 4, 2001 and 60/339,143 filed Dec. 10, 2001 and is related to commonly assigned copending U.S. patent application Ser. No. 10/125,170, filed Apr. 18, 2002, entitled "Methods and Systems for Authentication of Components in a Graphics System."

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2001, Microsoft Corp.

FIELD OF THE INVENTION

This patent application relates to commonly assigned copending U.S. Patent Application No. AA/BBB,CCC, filed Month DD, YYYY, entitled "Methods and Systems for Authentication of Components in a Graphics System."

FIELD OF THE INVENTION

The present invention relates to methods and systems for cryptographically protecting secure content. More particularly, the present invention relates to techniques for cryptographically securing content routed through a graphics pipeline, providing both confidentiality and tamper protection with respect to the content.

BACKGROUND OF THE INVENTION

The Internet and many other sources and applications now provide a vast array of streaming and fixed media or other content for listening, viewing, processing, storing and otherwise rendering. However, currently there is no practical way of capturing, recording or rendering the streaming or fixed media or content in a copy-protected manner so that a pirate cannot tap into the stream at some point along the pipeline, either as the content is being processed or as the content is being rendered, and take possession of a copy of or alter the content. This problem has existed in connection with other media rendering and recording devices in the past, e.g., VCRs for television content, or tape recorders for audio signals, but with at least one key difference. Since digital media content can be recorded with virtually no signal loss, this poses a "risk" for copyright owners that their works will be freely shared (pirated) without compensation. With VCRs and tape recorders, the device(s) and transmission media invite noise or corruption of data into the recording process. With streaming or fixed digital media, there is no reason why virtually lossless conversions and re-transmissions cannot be effected, at least to the limits of human ear and eye capabilities, and there is no reason why unadulterated digital data cannot be stored and freely distributed. Thus, it would be desirable to prevent unfettered re-distribution of digital data because there is little difference between what copyright owners can provide for a fee and what a pirate can provide for free. Moreover, with respect to communications that are desired to be confidential, such as e-commerce transactions, it is important to the user engaged in the dialog that no unauthorized third party be privy to the transactions. Thus, with respect to content from a trusted source, there is currently no practical way for the data to be "securely" processed or rendered on a user's computer without preventing piracy, or corruption.

In particular, once the content is pipelined among a host computing system, one or more graphics processing units (GPUs), and a rendering device, e.g., a monitor, there are a number of opportunities for a pirate or other unauthorized third party to camp on a line or signal, and either pirate or corrupt the signal. Moreover, as user dialogs become more sophisticated via messaging services and video teleconferencing, providing a trusted pipeline for secure content from wherever originated becomes all the more important moving forward.

Furthermore, it is clear that future generations of operating systems, computing devices and applications will utilize more computing power from the GPUs for business applications, as opposed to drawing most computing power from the CPUs as in today's personal computers (PCs). Thus, ensuring that content that is sent to the GPUs via "trusted graphics" applications will be a fundamental feature for future computing devices, and one not addressed adequately by present computing systems.

This problem of providing a secure pipeline for trusted content can be thought of as being twofold: (1) one must ensure that the trusted content cannot be copied or viewed at some weak point during the pipeline (confidentiality) and (2) one must ensure that the pipeline prevents unauthorized corruption of data in the pipeline (protected). In the context of system security, complexity is a liability because it makes it more difficult to prove a system's security. As with an airport or other security scenario, the more entry and exit points there are in the system, the more difficult it becomes to ensure security. In this regard, presently there is no means by which the bulk of GPU functionality and the display driver(s) can be trusted in terms of both confidentiality and protectability. Thus, it would be desirable to implement a trusted graphics environment in connection with a computing device which receives content from a trusted source, such that a user of the device can be assured that the content cannot be copied without authorization and cannot be tampered or altered by a third party.

SUMMARY OF THE INVENTION

In view of the foregoing, the present invention provides methods and systems for cryptographically protecting secure content in connection with a graphics subsystem of a computing device. Techniques are implemented to encrypt the contents of video memory so that unauthorized software cannot gain meaningful access to it, thereby satisfying the goal of confidentiality. Moreover, a mechanism for tamper detection is provided so that there is awareness when data has been altered in some fashion, thereby satisfying the goal of protectability. In various embodiments, the invention describes how to encrypt the contents of overlay surfaces and/or command buffers, and/or describes how to enable the GPU to operate on encrypted content while preventing its availability to untrusted parties, devices or software.

The methods of the invention variously include techniques for cryptographically protecting secure content in connection with a trusted graphics system having video memory, graphics processing unit(s) (GPU(s)) and a cryptographic processing device communicatively coupled to the GPU(s), comprising requesting, by an application or device, the graphics system to perform processing or rendering of secure content, wherein the requesting includes transmitting by the application or device a session key to the graphics system and transmitting the secure content to encrypted portion(s) of the video memory, decrypting the content of the encrypted portion(s) of video memory by the GPU(s) in communication with the cryptographic processing device, performing the processing or rendering on the decrypted content by the GPU(s) and outputting the content from the GPU(s).

Similar methods of the invention variously include requesting, by an application or device, the graphics system to perform processing or rendering of secure content, wherein the requesting includes transmitting by the application or device a session key to the graphics system for verification by the cryptographic processing device and transmitting the secure content to encrypted portion(s) of the video memory, decrypting the content of the encrypted portion(s) of video memory by a decryption mechanism of an input unit of the GPU(s), wherein the decryption mechanism is in communication with the cryptographic processing device, performing the processing or rendering on the decrypted content by the GPU(s), encrypting the content with an encryption/decryption mechanism of an output unit of the GPU(s) and outputting the encrypted content from the GPU(s).

Other features and embodiments of the present invention are described below.

BRIEF DESCRIPTION OF THE DRAWINGS

The methods and systems for cryptographically protecting secure content in accordance with the present invention are further described with reference to the accompanying drawings in which:

FIGS. 6A to 6B illustrate exemplary swizzling of a YUY2 format in accordance with the invention;

DETAILED DESCRIPTION OF THE INVENTION

Overview

Figure 1A:
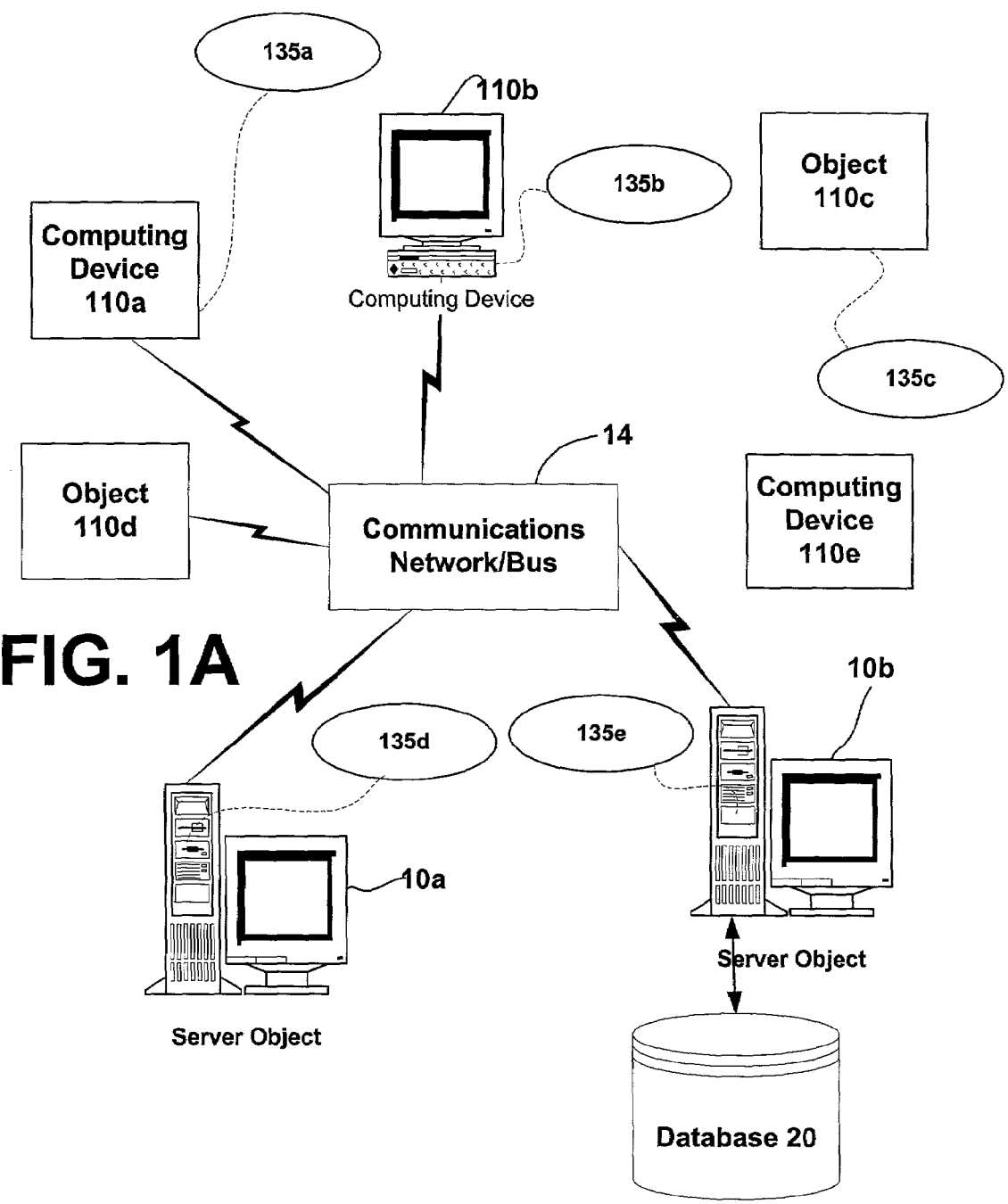
FIG. 1A is a block diagram representing an exemplary network environment having a variety of computing devices in which the present invention may be implemented.

This present invention provides systems and techniques for augmenting an operating system, or other intermediary between content from a trusted source and a graphics system for processing, and/or rendering the content in order to enable 'trusted graphics' applications, such as tamper-resistant, confidential dialogs and the playback of premium content that is resistant to unauthorized duplication. One way of viewing the invention is that it provides three 'levels' of security: (1) encryption of the contents of overlay surfaces (2) enabling the GPU, or other coprocessing device, to operate on encrypted content without making it available to untrusted parties and (3) enabling command buffers to be encrypted.

As mentioned, in the context of system security, complexity is a liability because it makes it more difficult to prove a system's security. As a result, the invention begins by considering that the bulk of GPU functionality and the display driver(s) must be considered untrustable. The invention then applies techniques that increase the chances of a correct implementation in terms of confidentiality and protectability by limiting the scope of the hardware that may be implemented to meet the criteria for security.

Some terminology in accordance with the invention has already been discussed above. However, for the sake of clarity, some terms will now be emphasized. The term confidential refers to the prevention of an untrusted third party, such as a third party device or software, from gaining access to the trusted content information. An example of such confidentiality includes preventing an untrusted third party from gaining access to the playback of encrypted premium video content anywhere along the graphics pipeline. The term protected refers to the prevention of an untrusted third party, such as a third party device or software, from gaining access to or changing the trusted content information without being detected. An example of such protectability includes preventing an untrusted third party from gaining access to or altering the display of a secure dialog that might occur during an e-commerce transaction.

In this regard, the invention considers overlapping windows, e.g., a user interface on top of a premium content video streams, as well as unobscurable windows, which might be present during an e-commerce dialogs.

Exemplary Network Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may implicate the trusted graphics regime of the invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate trusted graphics pipeline(s) of the present invention.

FIG. 1A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 1A. In accordance with an aspect of the invention, each object 10 or 110 may contain an application that might request trusted graphics resources.

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 1A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 1A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients

110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other devices 111 and databases 20.

Exemplary Computing Device

Figure 1B:
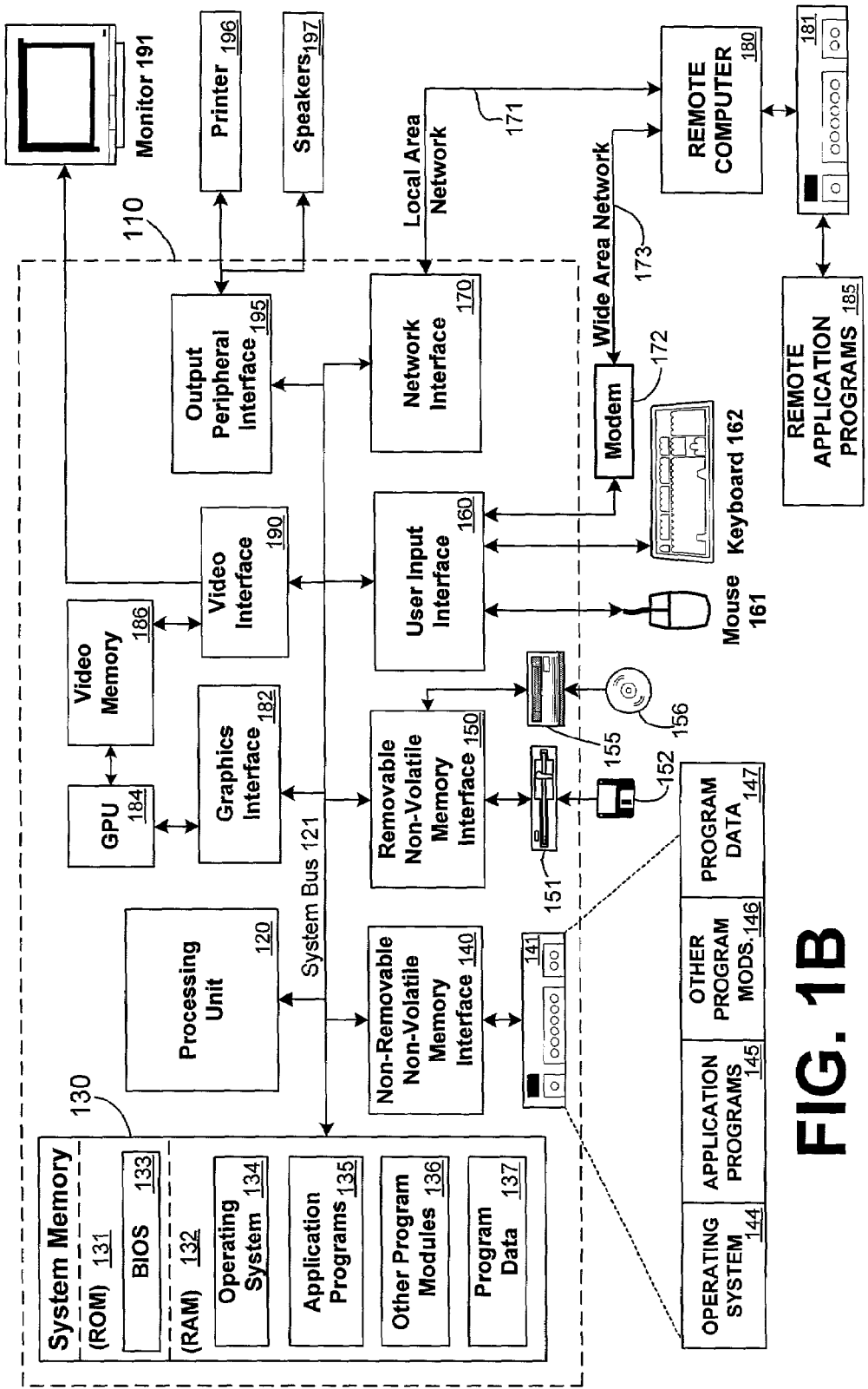
FIG. 1B is a block diagram representing an exemplary non-limiting computing device in which the present invention may be implemented.

FIG. 1B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or rendered is a desirable, or suitable, environment for operation of the cryptographic protection of secure content of the invention.

Although not required, the invention can be implemented via an operating system, application programming interface (API), and/or included within application software that interfaces to trusted content. In various embodiments, the invention also applies to hardware which conforms to interfacing, and encryption techniques described below. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1B illustrates operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B provide storage of computer readable instructions, data structures, program modules and other data for the computer 110. In FIG. 1B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In general, it is this portion of a computing device that is vulnerable, and accordingly the present invention provides protection and confidentiality of data being processed or rendered incident thereto. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1B. The logical connections depicted in FIG. 1B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s Net platform includes servers, building-block services, such as Web-based data storage and downloadable device software. Generally speaking, the Net platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are generally described in connection with methods implemented by software residing on a computing device, one or more portions of the invention may also be implemented via an operating system, application programming interface (API) or a "middle man" object between a coprocessor and inviolate content, such that the trusted content services may be performed by, supported in or accessed via all of .NET's languages and services, and in other distributed computing frameworks as well. Moreover, it can be appreciated that one or more of the techniques described in accordance with the invention may implicate changes to hardware, such as changes to the GPU to conform to the techniques.

Cryptogaphically Protecting Secure Content

Figure 2:
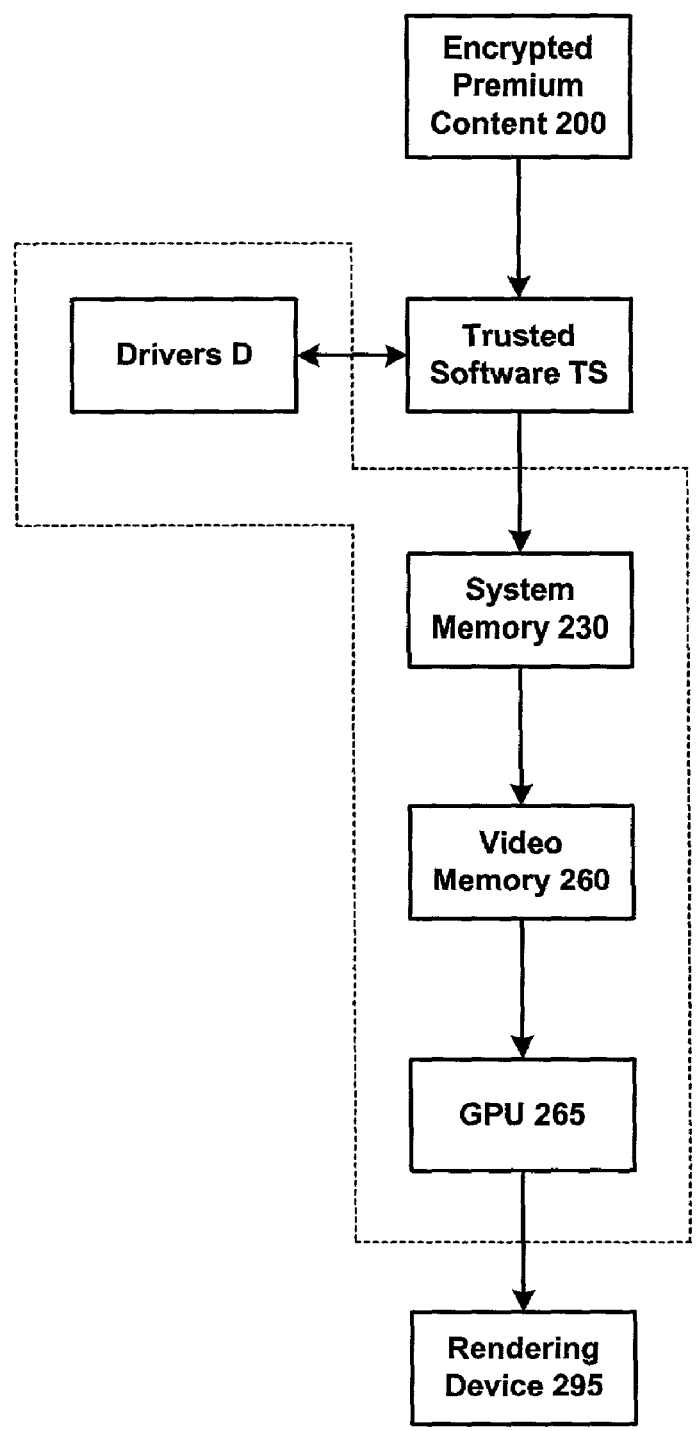
FIG. 2 is a flow diagram illustrating unprotected parts of a graphics pipeline which are protected in accordance with the invention.

The present invention thus provides methods and systems for augmenting an operating system, or any platform, to enable "trusted graphics" applications, such as tamper-resistant, confidential dialogs and to enable playback of content in a way that is resistant to unauthorized duplication. The problem solved by the present invention is illustrated by FIG. 2 in which encrypted premium content 200 is being shown passed to or generated by a trusted software application TS. Incident to the use of the trusted software TS, the content 200 may implicate functionality of the GPU 265 prior to rendering (or other use) of the content 200 via a rendering device 295. Such content 200 will be passed from the system or host memory 230 to the video memory 260 for processing by the GPU 265. The dotted line in FIG. 2 illustrates where the security problem is. As related in the background, no present day systems properly ensure protected and confidential delivery of content through the elements surrounded by the dotted line. From the standpoint of the trusted software TS, the first problem is whether or not the components inside the dotted line can be trusted with the content before handing off the content to the GPU. Assuming the trusted software TS can authenticate the components inside the dotted line properly, the second problem from the standpoint of the trusted software TS is that trusted software TS must be reasonably sure that, once the data is handed off into the dotted line, the data will not be altered. The present invention addresses both types of problems in various embodiments described below. In various ways, the methods and systems are implemented by (1) encrypting the contents of overlay surfaces (2) enabling the GPU to operate on the encrypted content without making it available to untrusted applications or parties and (3) encrypting the content of command buffers.

A first aspect to the trusted graphics processing and rendering problem addressed by the invention relates to the provision of a cryptographic (sometimes herein referred to as 'crypto') processor and indexed key management. Commonly assigned copending U.S. patent application Ser. No. 10/125,170 (the '170 application), filed Apr. 18, 2002, entitled "Methods and Systems for Authentication of Components in a Graphics System" teaches techniques for authenticating component(s) in connection with a graphics system, as described below. It is to be understood, however, that the invention presumes that authentication has occurred and thus any authentication techniques may be leveraged to provide a trusted graphics platform as described in the various embodiments of the invention below.

Exemplary Authentication

In this regard, secure graphics cards must be able to authenticate themselves as such. In particular, trusted software must be able to distinguish a secure graphics card from a traditional graphics card or a circumvention device, such as a spoof. In addition, trusted software must be able to reveal cryptographic keys to the graphics card and be able to verify that the receiver of the keys is indeed a secure graphics card. For this purpose, secure graphics cards are equipped with a crypto processor in accordance with the invention, which performs the cryptographic tasks of authentication and key transport.

With respect to hardware, crypto processors are provided in accordance with the invention, which are individualized and certified during manufacture. Each crypto processor contains a unique private decryption key $K_{priv}$. While many different encryption and decryption algorithms are contemplated in accordance with the invention and known to those in the cryptographic arts, for context, the algorithm described herein is RSA and the key length is 1024 bits, both non-limiting design choices, which may be tailored according to well-known tradeoffs depending upon the application and security level(s) desired.

In this regard, the crypto processor is permanently attached to the graphics card, either by adding it to an existing chip or adding it as a separate chip to the card. The crypto processor implements a public key crypto algorithm, as described in more detail below and hides a unique private key. In this regard, such a crypto processor can perform a public key decryption quickly with today's silicon technologies. However, the crypto processor may also include a public key accelerator and may implement a symmetric cipher (AES) and some control logic.

In one exemplary non-limiting embodiment, the crypto processor includes the following volatile registers: (1) a 256 bit register S for the session key. The lifetime of this key is typically the running time of the trusted software and (2) an array of a plurality of index keys. Each key may be 128 bits long, although other choices may be suitable. Each key is associated with a particular window and is used by the graphics card to decrypt its contents. The lifetime of each key is governed by instructions from the trusted software.

As mentioned, the crypto processor of the invention is permanently attached to the graphics card. Thus, there is required a means to securely interface with the crypto processor in order to make use of its functionality. As to interfacing with the crypto processor, the present invention considers at least two techniques: (a) an external interface to the trusted software TS and (b) an interface to the GPU 265. The former interface—at least in its cryptographic aspects must be standardized. The latter interface can be implementation specific, but should adhere to the overall guidelines set forth below.

With respect to the external interface implementation, the external interface uses a private key (PK) encryption protocol for authentication and key transport. Under this protocol, the trusted software TS encrypts a session key with the public key of the crypto processor. The crypto processor receives the resulting cryptoblob and decrypts it with its private key, thus obtaining the session key. Now, the trusted software and the crypto processor share a secret. The trusted software can use this session key to send instructions to the crypto processor.

In one non-limiting embodiment, the external interface is exposed through the following functions by the crypto processor:

The function SetSessionKey( ) performs the initial authentication step and key transport. It is the only function the accesses the public key functionality of the crypto processor. Thus, in one embodiment, the present invention contemplates calling this function once per boot. The following exemplary pseudocode represents one non-limiting implementation of SetSessionKey( ):

```
SetSessionKey( cryptoblob ) {
    PKDecrypt( privateKey, cryptoblob, sessionKey );
}
```

After successful completion of the operation, the sessionKey register contains a key, such as a 256 bit key, from the cryptoblob. The public key algorithm may be, for example, 1024 bit RSA.

Once a symmetric session key K has been established between the trusted software and the crypto processor, this key can be used to secure all further communication to and from the crypto processor. The trusted software and the crypto processor can communicate by means of simple Get and Set methods, whose parameters are cryptographically protected for confidentiality and integrity. In particular, the parameter block B of each call can be processed in the following non-limiting way:

AES(M|HMAC(M,K1),K2), where:
K1 is the first half of K (bits 0 to 127)
K2 is the second half of K (bits 128 to 255)
AES(M,K) is the result of encrypting message M under key K with AES in CBC mode HMAC(M,K) is the result of computing an HMAC over an appropriate hash function on message M with key K
A|B is the result of concatenating A and B.

This format can be used for the input parameters and for the output parameters of the following functions:

Set([IN] BOOL needsAck, [IN] BITS 128 nonce,
    [IN] ENUM propertyID, [IN] BYTESE-
    QUENCE propertyParamters, [OUT] BYTESE-
    QUENCE ack)

where:
needsAck is a boolean value, which allows the trusted software to indicate, whether an acknowledgement is required.

nonce is a 128 bit value chosen by the trusted software. The nonce can be used in the acknowledgement, if an acknowledgement was requested.

propertyID identifies the property, which is being set. An exemplary list of supported properties is given below in Table 1.

propertyParamters is a sequence of parameters, which is specific to each propertyID.

Lastly, Ack is the acknowledgement of the operation. The crypto processor produces ack if and only if needsAck was set. Ack is composed of the nonce followed by a message, which is specific to each propertyID.

TABLE 1

List of Property IDs for Get function

| Property ID | Needs Ack | Parameters | Acknowledgement |
|---|---|---|---|
| Index key | Yes | Index, key, purpose | Ok, fail |
| Output lock | Yes | { lock, unlock } | State after the lock operation |
| L2KEYMGMT | Yes | Renewal frequency | Ok, fail |

With respect to the Index key property ID, this method writes a new key and purpose tag into the key register identified by index.

With respect to the Output lock property ID, this method sets the output lock flag. When this flag is set, the screen geometry (width, height, color depth, refresh rate) as well as the graphics card output (VGA, DVI) cannot be changed. In particular, the graphics card will not execute instructions to change these settings while the output lock flag is set.

With respect to the L2KeyMgrnt property ID, this method sets the key renewal frequency under the second layer of protection described in accordance with the invention, i.e., encrypting inputs and outputs described in more detail below.

Similarly, the Get function is proposed as follows:

Get([IN] BITS 128 nonce, [IN] ENUM propertyID,
    [IN] BYTESEQUENCE propertyParamters,
    [OUT] BYTESEQUENCE response)

where:
nonce is a 128 bit value chosen by the trusted software to be used in the response.

propertyID identifies the property, which is being set. The list of supported properties is given below in Table 2.

propertyParamters is a sequence of parameters, which is specific to each propertyID.

Response contains the result of the operation. Response is composed of the nonce followed by a message, which is specific to each propertyID.

TABLE 2

List of Property IDs for Set function

| Property ID | Parameters | Response |
|---|---|---|
| Output ports | key index | VGA, AGP, etc. |
| Authentication Code | key index | X-bit number |
| DX-SEC version | None | Version number |
| Secure Surface Count | None | Number of supported secure surfaces |
| Overlapping surface count | None | Number of supported overlapping surfaces |
| Primary type | None | 1 |
| Geometry | None | Width, height, refresh rate, color depth of the primary surface |

With respect to Output ports, this method returns the setting of the graphics card outputs, e.g., VGA, DVI, etc.

With respect to Authentication code, this method returns the hash of the contents of a window as per the first layer of protection described in accordance with the invention, i.e., encryption of overlays.

With respect to DX-SEC version, this method returns the version of DX-SEC supported by the graphics card.

With respect to Secure surface count, this method returns the number of secure surfaces supported by the graphics card.

With respect to Overlapping surface count, this method returns the number of overlapping secure surfaces supported by the graphics card.

With respect to Primary type, this method returns 1, and provides future flexibility.

With respect to Geometry, this method returns the width, height, refresh rate and color depth of the primary surface.

The Set function may still further include a method that sets the location or size of a protected region overlay, or the location and size of a fraction of a main (primary) surface that should be decrypted.

Thus, the above SetSessionKey, Get and Set function relate to non-limiting embodiments of an external interface.

The term "internal interface" refers to the interface between the crypto processor and the rest of the graphics card. The details of this kind of interface in accordance with the invention are up to the implementation of each individual graphics card, subject to the following restrictions: (1) the crypto processor should be permanently secured to the graphics card and (2) the connection between the crypto processor and the rest of the graphics card should not be exposed.

In this regard, removal of the crypto processor from the graphics card should not be trivial. If the crypto processor is implemented as a separate chip, this is mainly a restriction on the mechanical interface, which attaches the crypto processor to the graphics card. Typically, the crypto processor should be soldered onto the graphics card. Alternatively, the crypto processor could reside on the same chip as the main GPU. Use of standardized mechanical interfaces, which allow the crypto processor to be removed, e.g., smart card readers, socket mounts and the like, is not acceptable.

Moreover, the physical connection between the crypto processor and the rest of the graphics card must not be accessible and must not be exposed through standard interfaces. For example, a USB connector on this bus is not acceptable in accordance with the invention.

With respect to rules for key management, each index key can only be used in accordance with its associated purpose parameter. In one embodiment, the values of the purpose parameter have the following meanings:

L1STREAM: This key may only be used with the DX-SEC stream cipher described below in connection with the first layer of security provided by the invention, i.e., the encryption of overlays.

L2BLOCK: This key may only be used with the block cipher in ECB mode of the second layer of security provided by the invention, i.e., encrypting inputs and outputs, described below. The block cipher in the ECB mode is used to decrypt texture blocks, which were written by the trusted software.

In this regard, no copies of the keys should be kept, when the index has been filled with a new value.

First Layer of Security—Encrypted Overlays

Since video memory can be mapped and read by untrusted software running on the CPU, video memory cannot contain information in plaintext form. Video memory subject to this requirement includes the video memory used to refresh the display. An initial implementation of a system that meets this criterion in accordance with the invention encrypts the contents of an overlay surface. The overlay would then be decrypted on the fly by the DAC hardware, or just previous to reaching the DAC hardware, as the image is sent to the display.

Figure 3A:
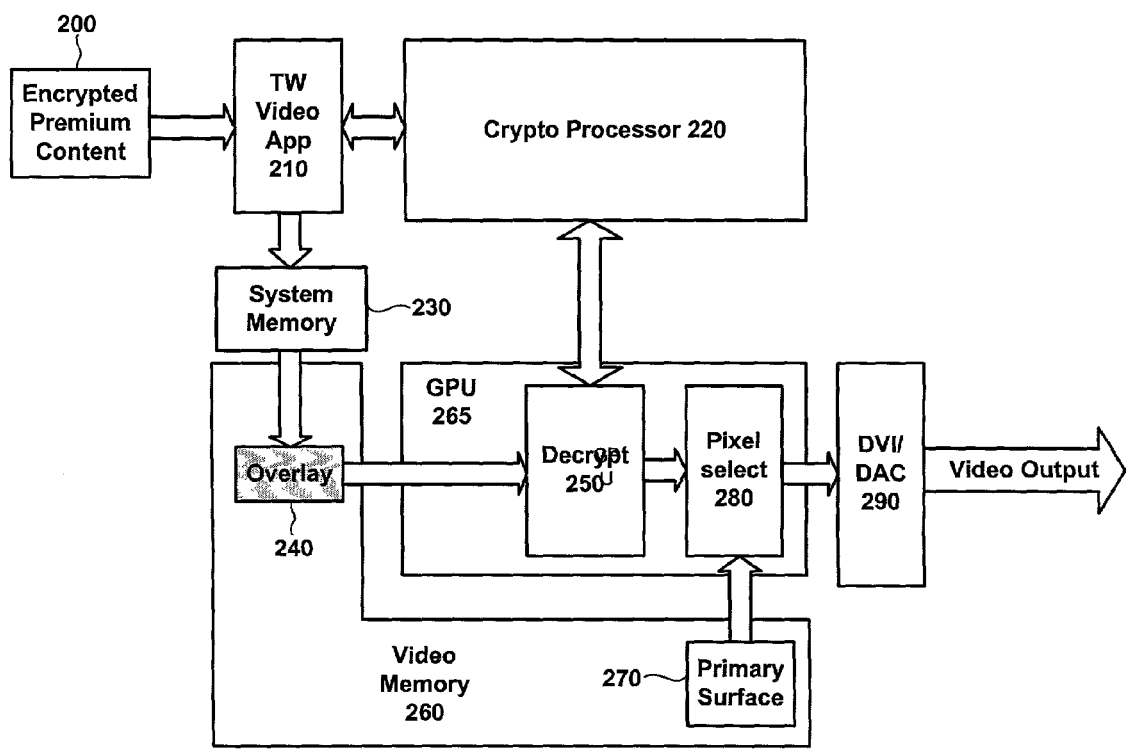
FIGS. 3A and 3B are block diagrams illustrating exemplary aspects of a first layer of security in accordance with the invention.

FIG. 3A illustrates an exemplary implementation of such a technique. Encrypted premium content 200, from wherever found or generated incident to trusted software application 210, is received by trusted application 210. An authentication exchange with crypto processor 220 ensues, such as the authentication exchange procedure(s) described above in exemplary embodiments or by any other technique for secure key delivery, either cryptographic or via a path protected by other means. The content 200 passes from system memory 230 to an encrypted overlay surface 240, which overlays primary surface 270 of video memory 260. In conjunction with the crypto processor 220, a decrypt portion 250 of GPU 265 decrypts the encryption layer provided by the encrypted overlay 240 and passes the content to pixel select 280 for output to digital video interface (DVI)/ digital to analog converter (DAC) 290 for output to a rendering device, such as a monitor. However, the system depicted in FIG. 3A does not meet all the criteria described above, since there is only one overlay. To meet the minimum bar of functionality needed for a trusted environment, such as trusted windows, the invention enables two overlays in an alternate embodiment. The first "confidential" overlay is basically an overlay that exists in platforms today, primarily to play back video, augmented such that its contents can be encrypted. The second overlay is specifically designed to present sensitive user interface such as e-commerce dialogs. This 'protected overlay' is always-on-top and non-obscurable, i.e., no color keying and has precedence over the first overlay. The second overlay may be subjected to certain limitations to minimize cost. For instance, the second overlay may be provided such that the data is in the same pixel format as the primary and is not able to be stretched or multi-buffered. In addition, the contents of the protected overlay can be verified by the hardware. Table 3 summarizes exemplary differences between the confidential overlay and the protected overlay.

TABLE 3

Contrast Confidential and Protected Overlays

| Item | Confidential Overlay | Protected Overlay |
|---|---|---|
| Same pixel format as primary | Yes | No |
| Can be stretched | No | Yes |
| Can be destination colorkeyed | Yes | No |
| Can be multi-buffered | Yes | No |
| Is always on top | No | Yes |
| Contents can be verified | No | Yes |

Figure 3B:
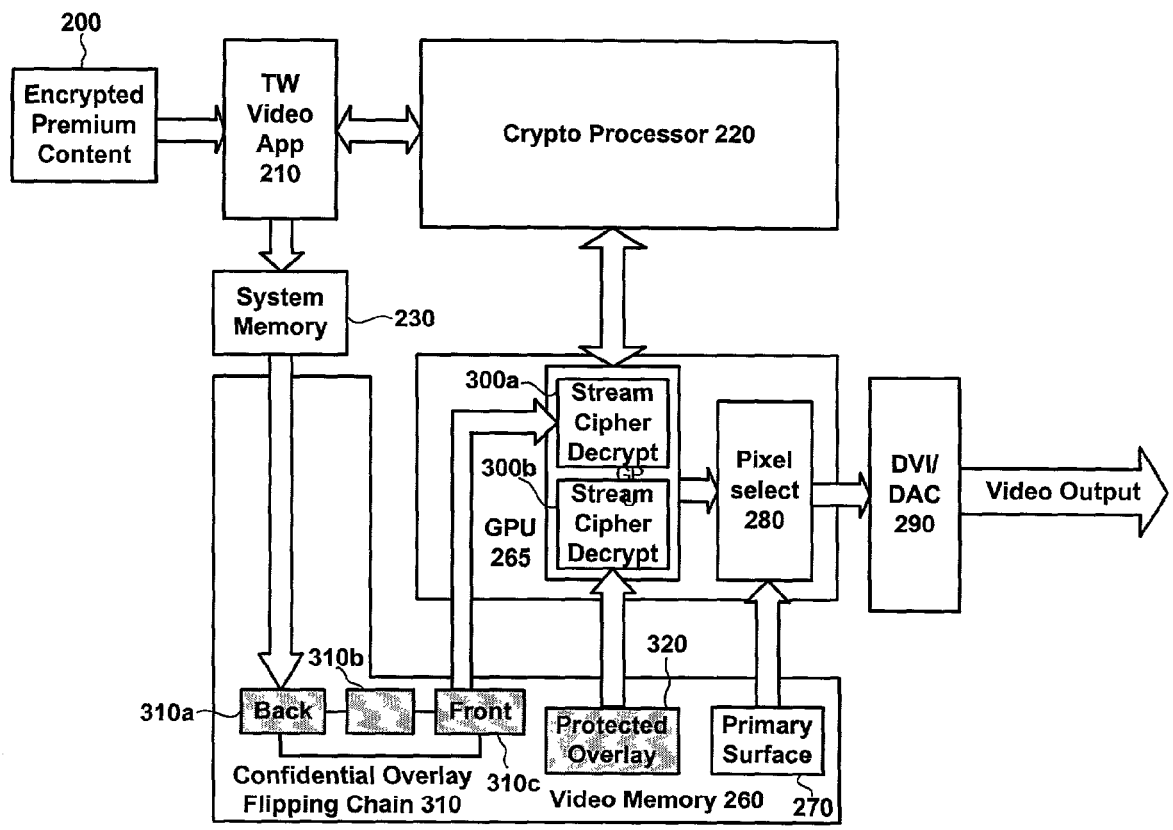

FIG. 3B shows a system that includes both confidential overlays, e.g., overlays 310a, 310b and 310c of confidential overlay flipping chain 310, and protected overlays 320. When possible, stream ciphers are used for secure surface encryption because they are faster and simpler to implement than block ciphers (see Appendix A for more detail). Stream ciphers encrypt data based on the "position of the byte in the stream." Thus, the first level of security of the invention initializes the stream cipher with the pixel encryption key at the upper left corner of the surface. The stream cipher is advanced for every pixel contained within the overlay surface regardless of whether the pixel will be displayed. The proposed system contains two stream cipher decryption components 300a and 300b, one for the confidential overlay and one for the protected overlay, respectively. Once the decrypted pixel values are available, the hardware 280 selects the pixel value of the protected overlay 320, confidential overlay 310 (if the primary 270 is equal to the color key and/or if color keying is enabled) or primary 270 and sends the pixel value to the display hardware via DVI/DAC 290.

It is noted that an adversary could gain access to the overlays by any number of means, and thereby either make the displayed image invisible or replace secure content with noisy content, since data written by the adversary will also be decrypted. While the invention does not directly defend against these attacks, the invention does provide for an integrity check to ensure that the expected content was presented to the end user. Thus, if the output is something other than the input, the user or trusted software 210 can be alerted that there was tampering with the content.

With respect to a software interface to the overlays, besides the usual overlay information, such as the source and destination bounding box, destination color key, etc., the confidential overlay 310 maintains that the encryption key index be specified and the protected overlay 320 additionally maintains that a memory location be specified where the cyclic redundancy code (CRC) of the decrypted overlay contents should be written.

The confidential overlay interface is similar to existing overlays, except that the flip method specifies the encryption key index of the contents of the overlay back buffer 310*a*, i.e., the buffer to which the data is being flipped.

The protected overlay interface is simpler and makes provision for a CRC of the surface to be forwarded to a memory location after it has been displayed for the first time. A standardized hardware interface controls the location of the overlay, and makes the CRC available to interested software on a polling basis. For example, one register can indicate whether the CRC is available, and another can enable the CRC to be read. For instance, the following exemplary pseudocode may be utilized in connection with the protected overlay interface:

HRESULT UpdateOverlay(LPPOINT ppntUL);

where:

ppntUL specifies the upper-left corner of the protected overlay.

In this regard, the software 210 calculates the CRC value that it expects if it is concerned with integrity.

Second Layer of Security—Encrypted Inputs and Outputs

In accordance with the invention, to augment the GPU 265 to handle encrypted content as input and emit encrypted content as output, encryption and decryption hardware is added to the texture mapping unit (on the input side) and the alpha blending unit (on the output side), and the hardware designers cooperate to follow some rules in implementing this functionality. Since stream ciphers do not enable random access to encrypted data, the system uses block ciphers, encrypting the data, e.g., 128 bits at a time. The texture mapping unit decrypts on a cache line fill and the alpha blending unit decrypts when reading a cache line from the color buffer and encrypts before writing. The encryption keys used in these operations can be different.

Computational tasks other than 3D rendering, such as video decoding, are straightforward extensions of the just-described paradigm. Instead of textures, video macroblocks serve as the encrypted input; and instead of a color buffer, the output frame being decoded serves as the encrypted output. If content is to be protected as it is delivered in-band in the command stream to the GPU 265, how the command buffer may be encrypted as well is described below.

Figure 4A:
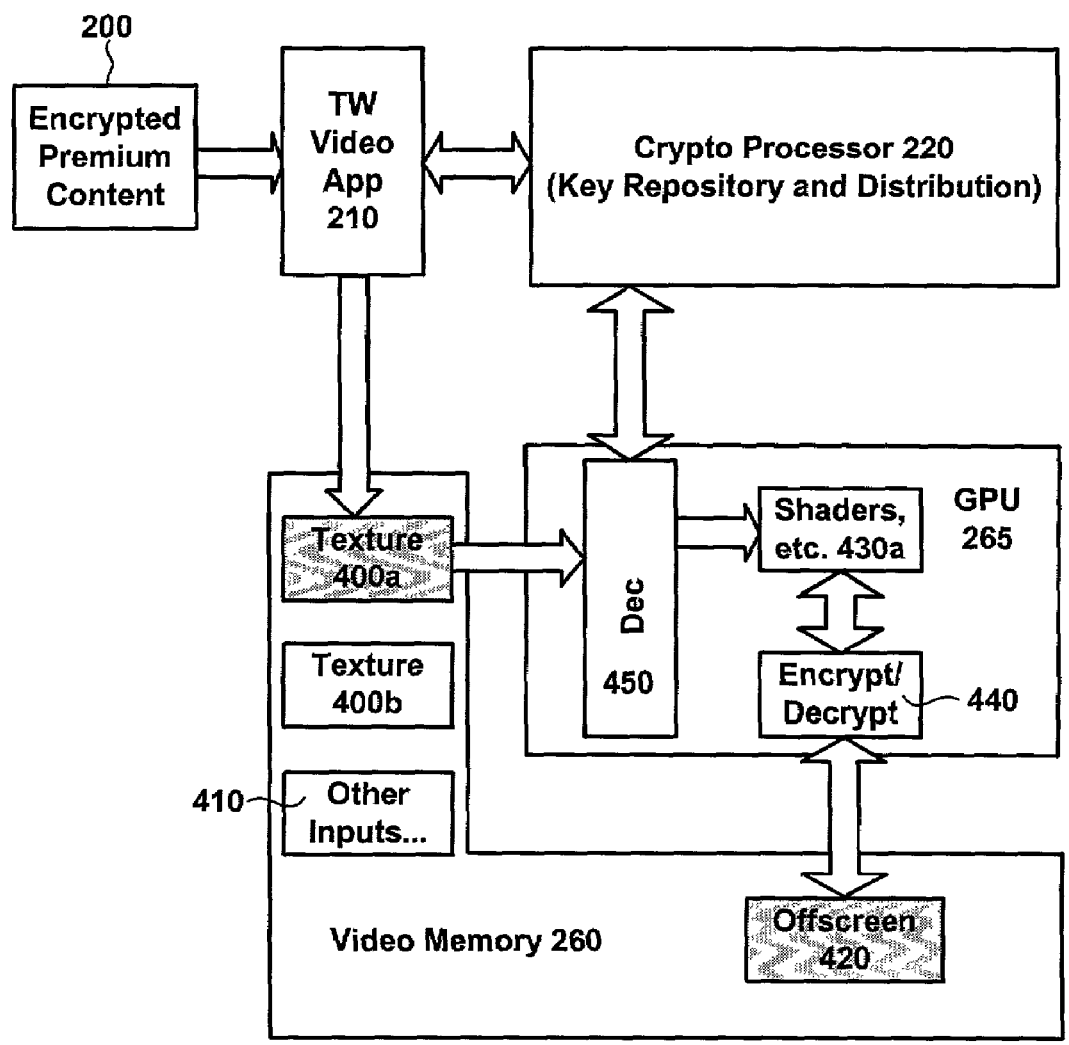
FIGS. 4A to 4C are block diagrams illustrating exemplary aspects of a second layer of security in accordance with the invention.

FIG. 4A depicts the just-described system performing a front end operation, taking an encrypted surface 420 as input and emitting an encrypted surface as output, i.e., the front end of the encrypted texture and color buffer techniques, via encrypt and decrypt component 440. The invention further provides encrypted texture 400*a*, whereas texture 400*b* can be a typical texture of the video memory 260. The encrypted texture 400*a* outputs to decryption component 450 of the GPU 265, which works together with the crypto processor 220 to decrypt the texture and apply graphics algorithms, such as shading, etc., to the decrypted data from component 440 with component 430*a*.

Anticipating the deployment of a composited, page flipping desktop, the system of FIG. 4A just described can protect the whole of the desktop, provided the DAC hardware can decrypt the primary 270 as well as the overlay surfaces 310 and 320 described above. It is noted that the DAC hardware decrypts using a block cipher rather than a stream cipher in such a case. Such a system enables an arbitrary number of confidential surfaces to participate in the desktop, with arbitrary Z ordering, blending, or even 3D or other effects applied to them without compromising security. Protected overlay surfaces 320, which must be always-on-top and whose contents must be verifiable, reside in separate surfaces. The confidential overlay 310 described above remains until it can be emulated in software by the secure page flipping desktop, or platform.

Figure 4B:
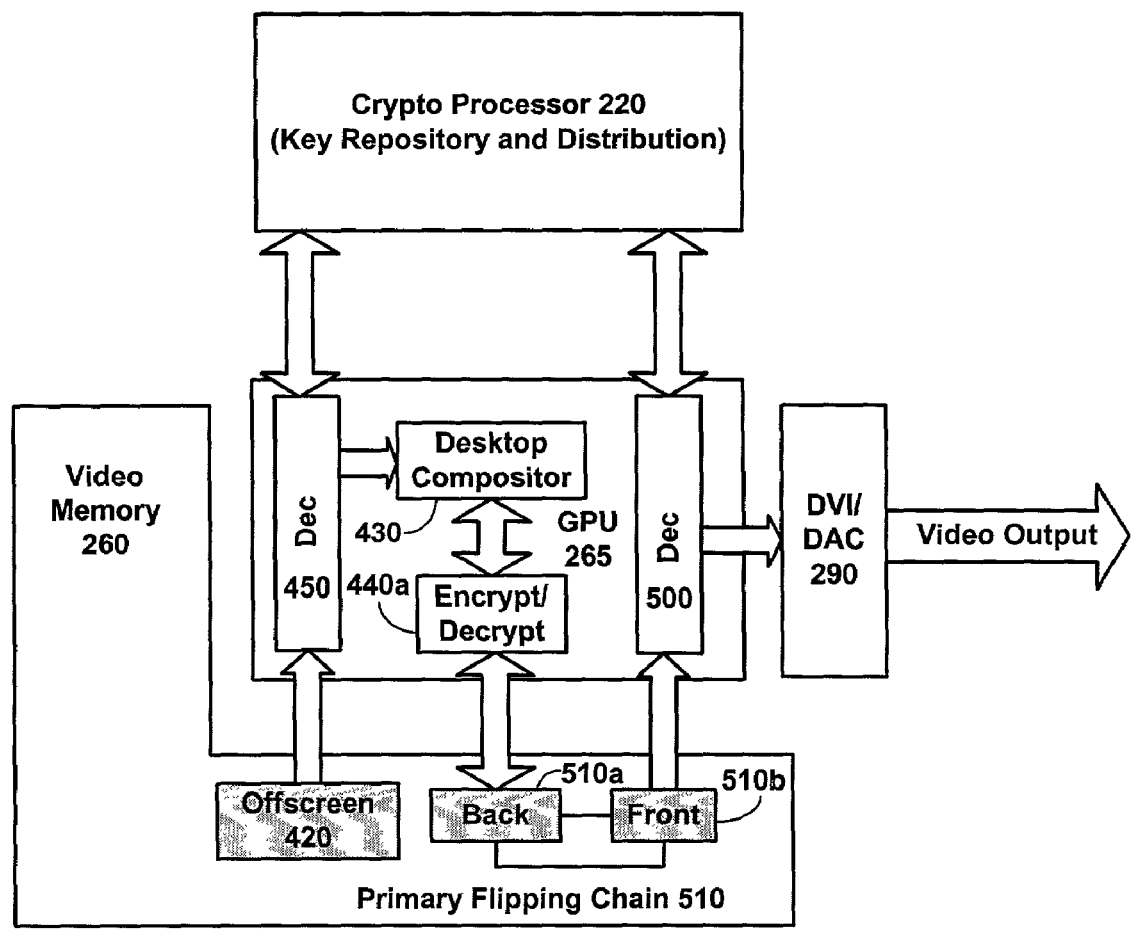

In one embodiment, in addition to being able to decrypt the primary 270, the system requires the GPU 265 to be able to encrypt plaintext from ordinary desktop applications as well, such as trusted word processors, so they too can participate in the desktop. FIG. 4B illustrates such a scenario wherein the primary flipping chain 510, including front 510*b* and back 510*a*, is encrypted. Thus, the primary surfaces may be operated upon by desktop compositor 430, protected by encryption/decryption component 440*a* for output therefromfrom/input thereto, respectively. In communication with crypto processor 220, a decryption component 500 then decrypts the front surface 510*b* for output to DVI/DAC 290. This exposes the system to certain types of attack, which are detailed below with respect to ensuring security, where some strategies for defending against these attacks are discussed.

Figure 4C:
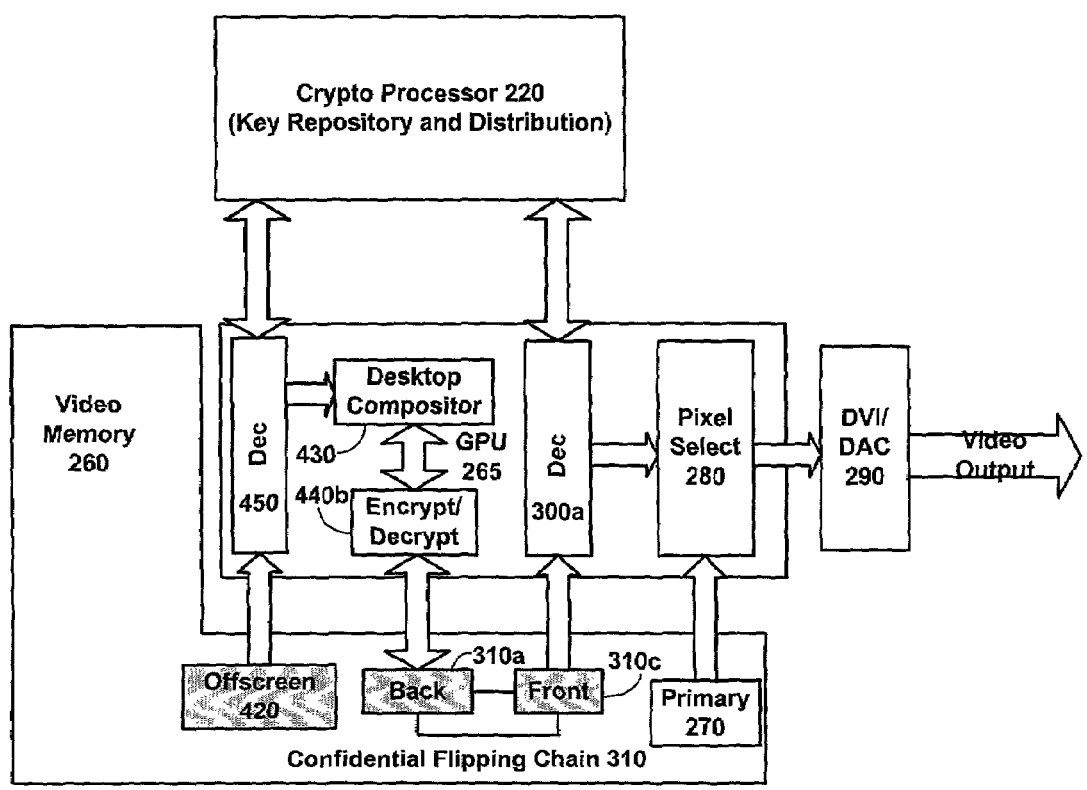

FIG. 4C depicts an alternative to FIG. 4B, wherein transcription to the confidential overlay flipping chain 310 is effected. Thus, as an alternative to encrypting the primary 270, in accordance with the invention, the hardware can enable stream cipher encryption for consumption by the confidential overlay hardware 300*a*, which can decrypt the stream cipher data together with crypto processor 220. This presentation mechanism may be less expensive than encrypting the primary with a block cipher, but may not be as scalable or flexible, as a design tradeoff. Since the confidential overlay 310 uses a stream cipher for encryption, a reasonable operation to support in this context is a 'copy' operation in which the input is decrypted by decryption component 440*b* using the block cipher of the input surface 510*a* and re-encrypted by component 440*b* using the overlay's stream cipher.

These embodiments, and various combinations thereof, are useful, for example, where one encrypted input at a time is sufficient, provided that any number of plaintext inputs can be combined with the encrypted input to generate encrypted output.

With respect to enduring security, there are a number of measures that may be implemented in accordance with the invention. First, the above second layer of security described relies on the idea that plaintext cannot be leaked out of the GPU 265 once it has been decrypted. For example, no debugging registers or other facilities exist that enable plaintext to be read out of the chip by the central processing unit (CPU) of the host. In addition to careful hardware design to avoid such leaks, the GPU 265 instruction set is designed so that it is impossible to enable decryption of the input without also enabling encryption of the output. Moreover, the hardware prevents leakage of plaintext data, whether by a rogue driver, by adversarial code, or by accident.

In addition, the hardware may not leak the keys. Once the keys are delivered to the GPU 265 via the cryptographic protocol described according to the authentication exchange, they are only available to the encryption and decryption components.

As discussed above, if the GPU 265 is able to encrypt plaintext for display in the primary 270, this facility is considered a vulnerability in the system since this encryption facility is the only mechanism described in which an adversary could have plaintext and corresponding ciphertext available at the same time. By mapping the primary surface so it is viewable by the CPU and creating a window that must be encrypted, the adversary can construct a subset of the ciphertext blocks that correspond to known plaintext blocks. These so-called "dictionary attacks" work best when the number of blocks that are "interesting" is small. For example, for display of black-and-white dialog boxes in a 32 bpp display mode, since there are 4 pixels per block, only 16 blocks are needed to display such a dialog. One possible avenue for an adversary who has discovered the 16 ciphertext blocks would be to falsify a dialog to the end user by creating content that is meaningful even after decryption by the GPU 265. For this reason, the protected overlay is best suited for tamper-resistant dialogs because it enables applications to detect when the end user has not seen what was expected.

There are thus two good strategies to frustrate adversaries who wish to create dictionaries. First, since dictionaries are only good for a given key, changing the key and re-encrypting the content forces the adversary to start over with a new dictionary. Furthermore, for encryption of the primary, the key need not be made available to software—it can be rolled in hardware and the software only needs to be notified that the key has changed. Since the previous key is still available, the software can use the previous key to decrypt and re-encrypt the portions of the primary that have not changed. Hence, the crypto processor 220 periodically rolls the encryption key for the primary 270 and in such a way that the previous key is still available, e.g., a double buffering of the encryption key indices, and in a way that notifies the software that the key has been rolled.

Another strategy involves encoding the location within the image before encryption. For example, the (x,y) pixel location in the image (or some derivative value, such as the image offset) can be exclusive or-ed (XOR'd) into the pixel data before encrypting it; the operation can then be undone after decryption. As a result, the blocks for pixels in different areas of the surface are encrypted differently, and the plaintext-ciphertext mapping is only meaningful for a given position in the surface, which is unavailable to an assailant.

The present invention also provides predefined swizzled formats. Since textures and offscreen surfaces require random access, they must be encoded with block ciphers. There is good synergy between the typical block size for a block cipher and the typical cache line size for a modem 3D accelerator, e.g., if the cache line and block size are both 128 bits, then efficient encryption and decryption can be implemented in the hardware. Even if there are slight differences (e.g., block size of 128 bits and cache line size of 256 bits) the hardware implementation is likely to be efficient.

One problem with encrypted texture data is that a block encryption scheme requires that an adjacent block of bytes be available before it can be encrypted or decrypted; and a cache line fill requires that the pixel data be 'swizzled,' i.e., that the translation from an (X,Y) position in the image to an address be formed such that the cache line fill yields a 2D region of pixels. To date, hardware vendors have exposed ostensibly linear surface formats while swizzling image data without the knowledge of the application. Since trusted software will be emitting the encrypted texture data, however, the software must have a priori knowledge of the swizzling scheme so it can encrypt adjacent blocks of data and preserve 2D locality. In response, the invention defines a dictionary of swizzled image formats, including YUV 4:4:4, 4:2:2, and 4:2:0 as well as RGB formats, for use by the application. The performance of these formats may not be quite as high as if the images were swizzled to a hardware-specific format, but the encryption is worth a slight performance degradation, i.e., security in exchange for speed.

Figure 5A:
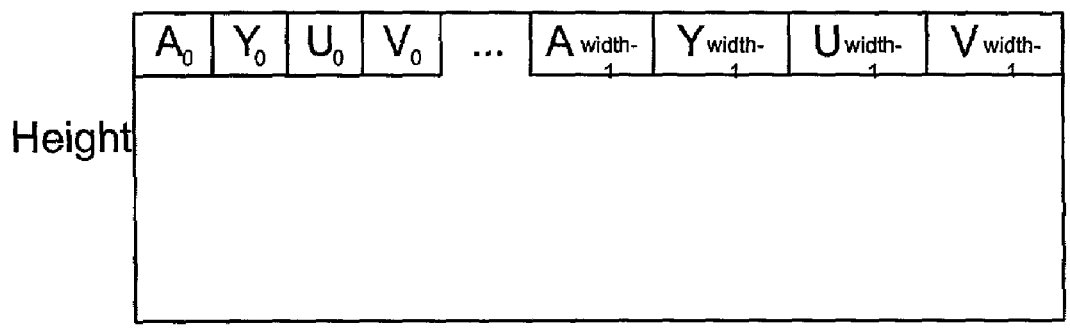
FIGS. 5A to 5B illustrate exemplary swizzling of an AYUV/ARGB format in accordance with the invention.

With respect to AYUV/ARGB (32 bpp, packed), this 32 bpp surface format contains an alpha channel in addition to 8-bit color channels for the luminance (Y) and chrominance (U and V) samples. Alternatively, it can contain a standard ARGB 32 bpp, since both formats are 32 bpp and packed. The following discussion assumes AYUV. The linear layout is as in FIG. 5A.

The offset of pixel (X,Y) in the image is as follows:

$$Offset=Y*Pitch+X*4$$

Assuming a 128-bit encryption block size and cache line size, 4 pixels can fit in a single block. Interleaving the least significant bits of X and Y before generating the address will result in improved 2D locality in a cache line fill. These blocks are laid out linearly, according to the format.

Figure 5B:
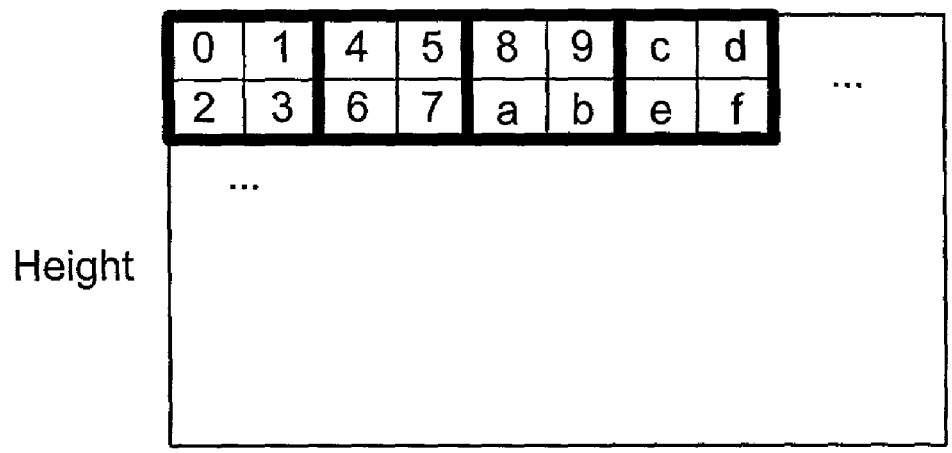

The resulting image layout is illustrated by FIG. 5B. Each numbered rectangle is a pixel and the bold rectangles are encrypted blocks. Exemplary pseudocode for the swizzling function of the invention for this format that converts an (x,y) location in the image to an offset is as follows:

```
DWORD
SwizzleAYUV( DWORD x, DWORD y, DWORD Pitch )
{
    // pitch is number of bytes per scanline of macro blocks
    DWORD BlockOffset = (y>>1)*Pitch+(x>>1)*(128/8);
    DWORD IntraBlockOffset =
    ((y&2)<<2)|((x&2)<<1)|((y&1)<<1)|(x&1);
    return BlockOffset+IntraBlockOffset*4;
}
```

With respect to YUY2 (16 bpp, packed), this surface format horizontally subsamples the 'chrominance' samples U and V by a factor of 2. The result is a packed image format that averages to 16 bits per pixel. The linear layout is shown in FIG. 6A. The swizzling format of the invention allocates encrypted blocks of 4×2 pixels, as shown in FIG. 6B. As with FIGS. 5A and 5B, the 128-bit blocks are swizzled as well. It is noted that with FIG. 6B and with the following exemplary swizzling pseudocode which translates (x,y) coordinate pairs into image offsets, U and V are assumed to have even X coordinates:

```
DWORD
SwizzleYUY2Y( DWORD x, DWORD y, const SURFACEDESC& sd )
{
    assert( x < sd.Width );
    assert( y < sd.Height );
    DWORD BlockOffset = (y>>1 )*sd.Pitch+(x>>2)*(128/8);
    DWORD IntraBlockOffset = ((x&2)<<1)|
            ((y&1)<<1)|
            ((x&1)<<0);
    DWORD dwRet = BlockOffset+(IntraBlockOffset<<1);
    return dwRet;
}
DWORD
SwizzleYUY2U( DWORD x, DWORD y, const SURFACEDESC& sd )
{
    assert( x < sd.Width );
    assert( 0 == (x & 1) );
    assert( y < sd.Height );
```

```
        DWORD BlockOffset = (y>>1)*sd.Pitch+(x>>2)*(128/8);
        DWORD IntraBlockOffset = ((x&2)<<1)|
                                ((y&1)<<1)|
                                ((x&1)<<0);
        return BlockOffset+(IntraBlockOffset<<1)+1;
}
DWORD
SwizzleYUY2V( DWORD x, DWORD y, const SURFACEDESC& sd )
{
    assert( x < sd.Width );
    assert( 0 == (x & 1) );
    assert( y < sd.Height );
    DWORD BlockOffset = (y>>2)*sd.Pitch+(x>>3)*(512/8);
    DWORD IntraBlockOffset = ((x&2)<<1)|
                            ((y&1)<<1)|
                            ((x&1)<<0);
    return BlockOffset+(IntraBlockOffset<<1)+3;
}
```

In this regard, for the pseudocode accompanying the swizzling of FIGS. 5A, 5B, 6A and 6B, the surface pitch is defined as the number of bytes per scanline of 128-bit blocks.

Figure 7A:
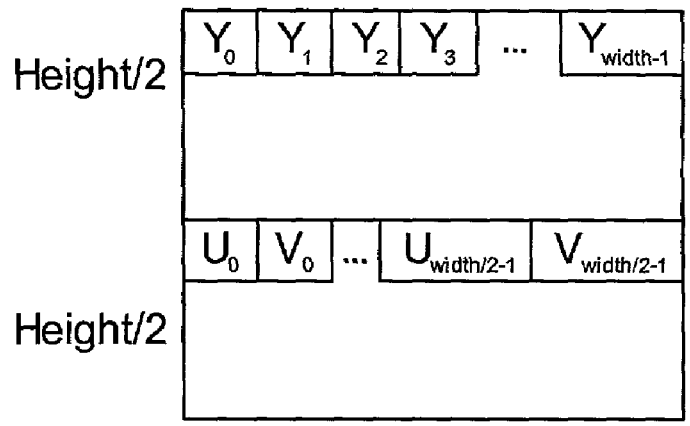
FIGS. 7A to 7B illustrate exemplary swizzling of a packed planar format in accordance with the invention.
Figure 7B:
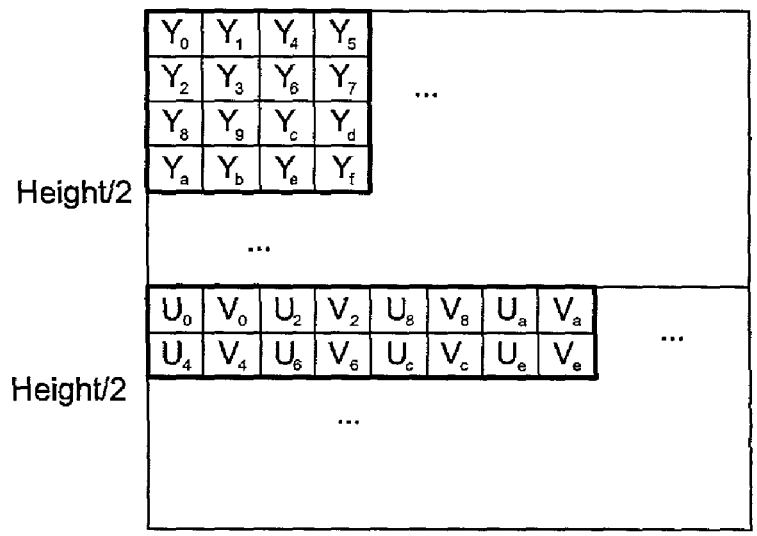
Figure 8A:
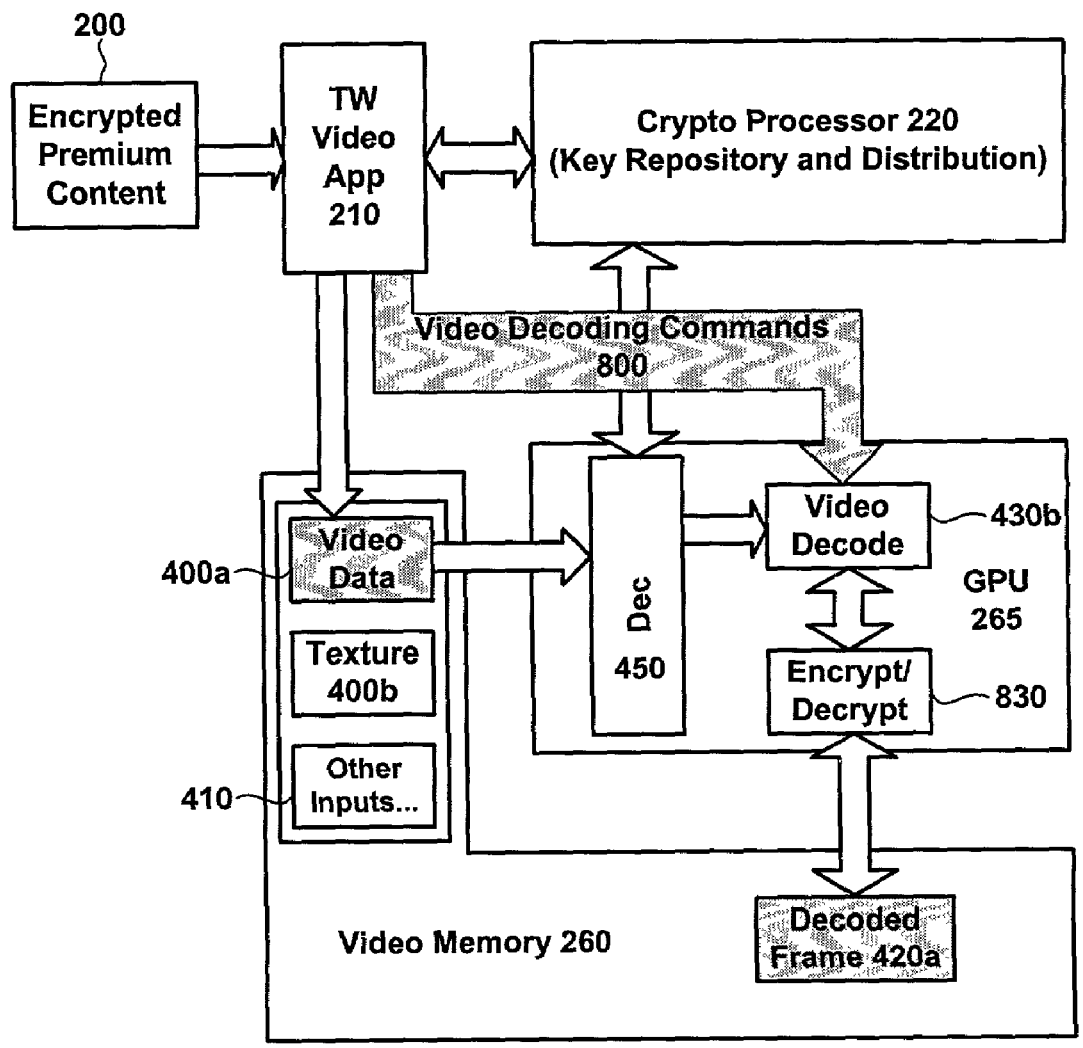
FIGS. 8A and 8B are block diagrams illustrating exemplary aspects of a third layer of security in accordance with the invention.
Figure 8B:
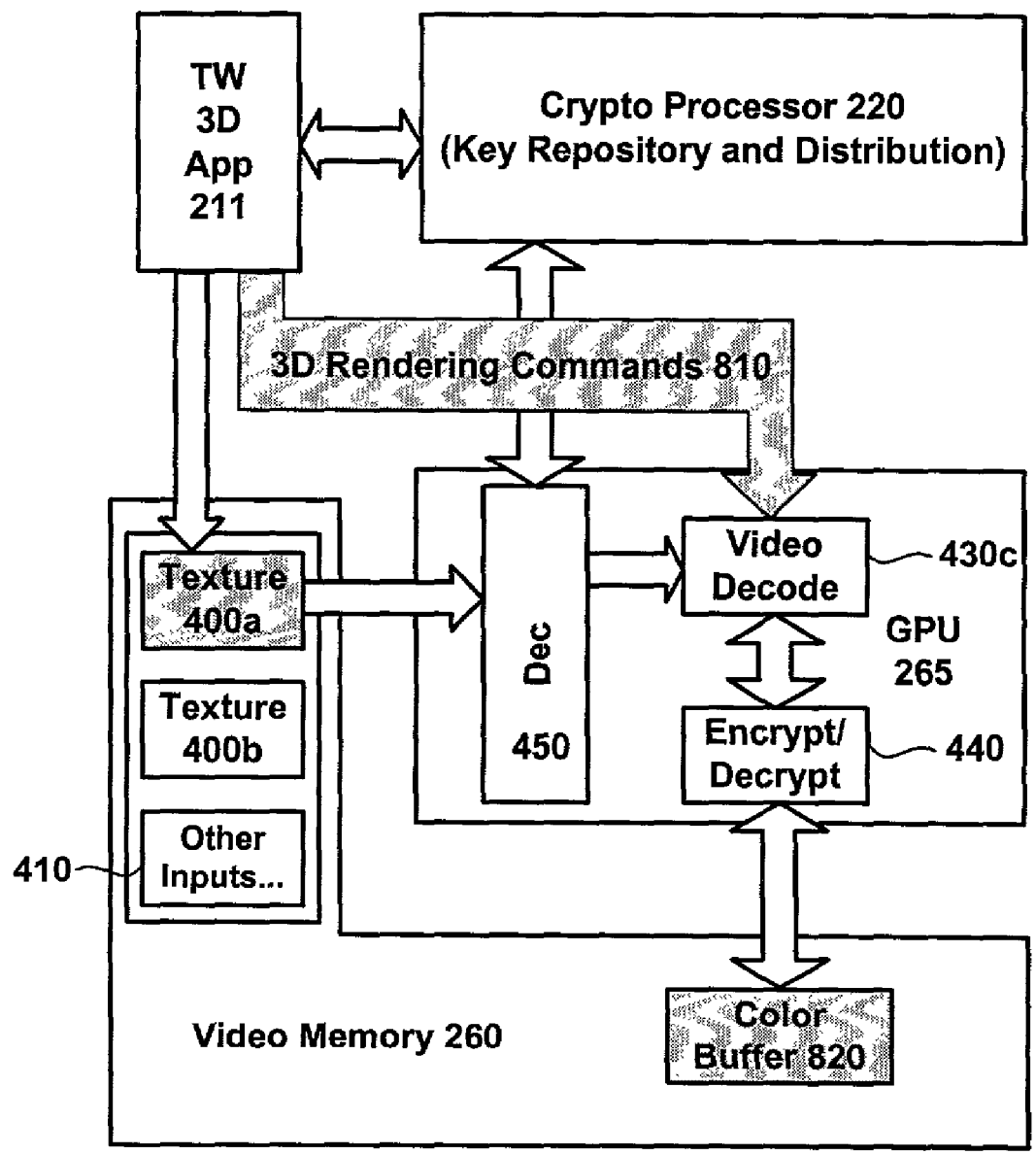

With respect to packed planar (12 bpp), this surface format subsamples U and V by a factor of 2 horizontally and vertically. The luminance and chrominance samples are laid out in two separate portions of the surface. The linear layout of packed planar (12 bpp) shown in FIG. 7A The surface pitch is defined as the number of bytes per scanline of 512-bit blocks in the Y plane. The pitch of the UV plane is half the pitch of the Y plane because there are ¼ as many samples, but twice as many color elements per sample. The resulting swizzled image format in accordance with the invention is shown in FIG. 7B.

Exemplary pseudocode for the swizzling function of the invention for this format that translates (x,y) coordinates to offsets for Y, U and V elements is as follows:

```
DWORD
SwizzlePP12Y( DWORD x, DWORD y, const SURFACEDESC& sd )
{
    assert( x < sd.Width );
    assert( y < sd.Height );
    DWORD BlockOffset = (y>>2)*sd.Pitch+(x>>2)*(128/8);
    DWORD IntraBlockOffset = ((y&2)<<2)|
                            ((x&2)<<1)|
                            ((y&1)<<1)|
                            (x&1);
    return BlockOffset+IntraBlockOffset;
}
DWORD
SwizzlePP12U( DWORD x, DWORD y, const SURFACEDESC& sd )
{
    DWORD PlaneOffset = (sd.Height>>3)*sd.Pitch;
    if ( (0!=(x&1)) || (0!=(y&1)) )
        __asm int 3
    x >>= 1;
    y >>= 1;
    DWORD BlockOffset = (y>>1)*sd.Pitch/2+(x>>2)*(128/8);
    DWORD IntraBlockOffset = ((x&2)<<1)|
                            ((y&1)<<1)|
                            (x&1);
    return PlaneOffset+BlockOffset+(IntraBlockOffset<<1);
}
DWORD
SwizzlePP12V( DWORD x, DWORD y, const SURFACEDESC& sd )
{
    DWORD PlaneOffset = (sd.Height>>3)*sd.Pitch;
    if ( (0!=(x&1)) || (0!=(y&1)) )
        __asm int 3
    x >>= 1;
    y >>= 1;
    DWORD BlockOffset = (y>>1)*sd.Pitch/2+(x>>2)*(128/8);
    DWORD IntraBlockOffset = ((x&2)<<1)|
                            ((y&1)<<1)|
                            (x&1);
    return PlaneOffset+BlockOffset+(IntraBlockOffset<<1)+1;
}
```

Third Layer of Security—Encrypted Command Buffers

Figure 9A:
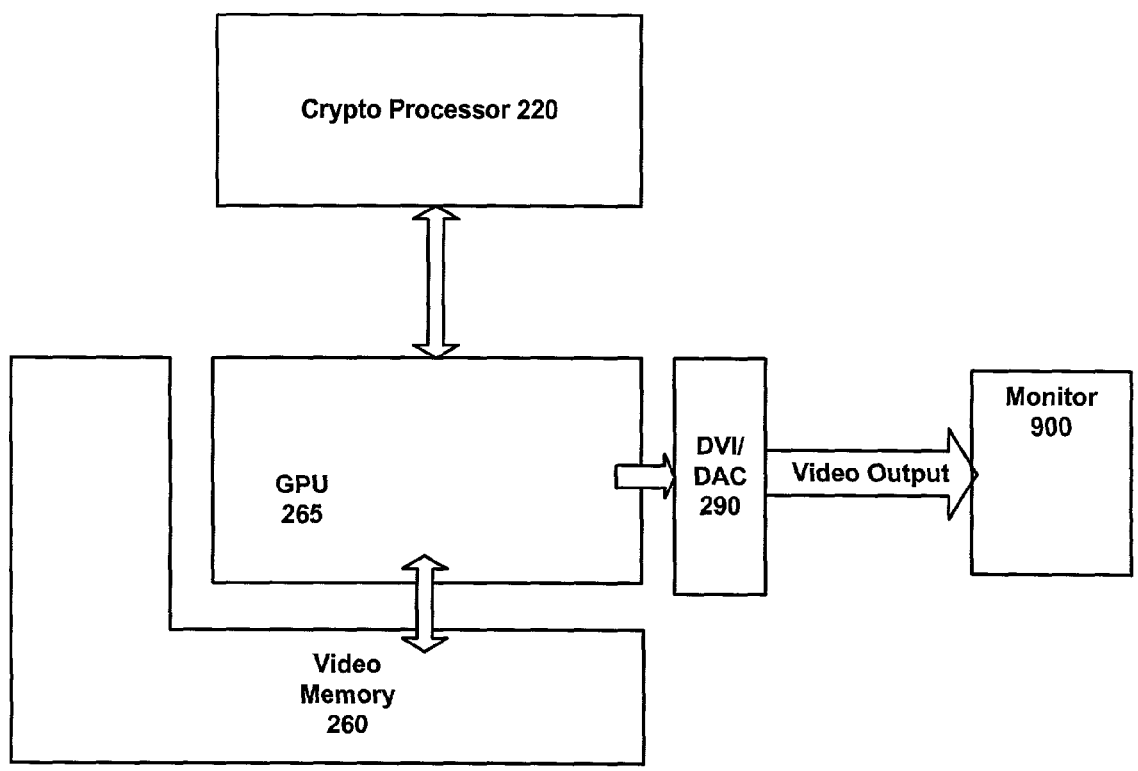
FIGS. 9A and 9B are block diagrams illustrating exemplary encryption techniques that may be applied to the output from a graphics processing unit in accordance with the invention.

The facilities of the embodiments described above with respect to the first and second layers of security can be augmented in accordance with the invention to encrypt the command buffers submitted to the GPU 265 in addition to the image data upon which the GPU 265 is operating. This functionality is desirable if the application 210 wishes to protect content that is sent to the hardware in-band in the command buffer. FIG. 9A shows video decoding using an encrypted command buffer 900, whereby the content is delivered to the encrypted texture 400a and is decrypted by decryption component 450 and decoded by the video decoder 430b. Although it is possible for the command buffer only to be encrypted, the content is encrypted in video memory as well as in the command buffer, as shown by encrypted decoded frame 420a. Encrypting the command buffer is thus appropriate in situations like this, where macroblocks are in video memory and with motion vectors and other commands sent in the command stream.

Figure 9B:
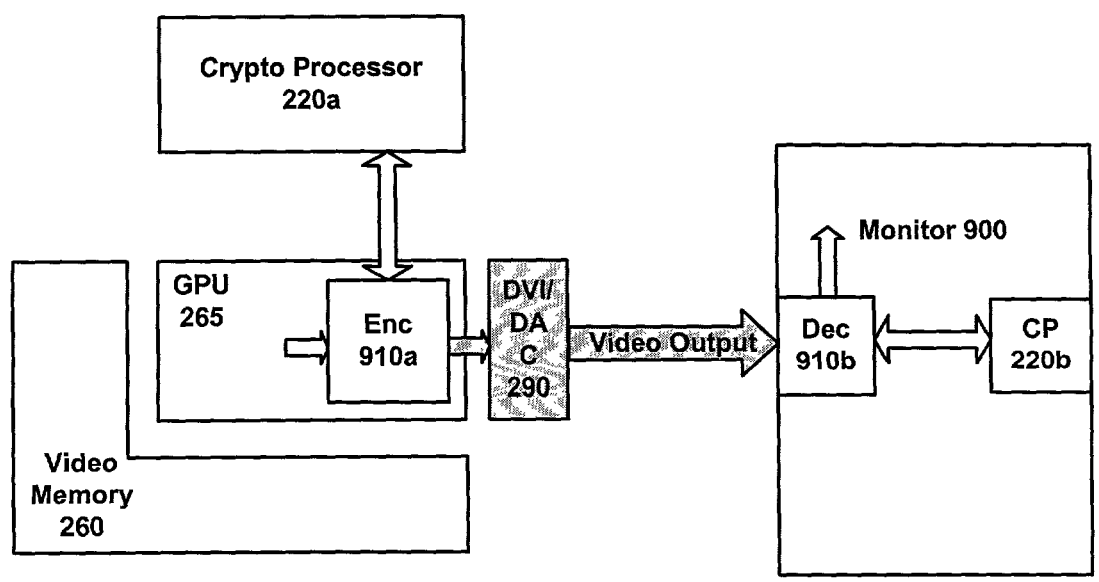

The atomicity constraint for encrypted texture data also applies to encrypted command buffer data, with the caveat that color buffer encryption may not be sufficient to protect the content in question. Intermediate buffers, e.g., the Z buffer, may also be encrypted to protect the system against plaintext attacks. FIG. 9B shows exemplary 3D rendering using an encrypted command buffer in accordance with the invention. As illustrated, the 3d rendering commands 810 are encrypted en route to video decoder 430c. The texture data 400a is decrypted by decryption component 450 and processed according to the commands 810 by video decoder 430c. Incident thereto, data in the color buffer 820 is encrypted via encrypt/decrypt component 830.

Tamper detection can be done before consumption of the command buffer, using two passes, or after the command buffer has been consumed. In one embodiment, tamper detection is enabled after display or rendering of the content.

Further Alternate Embodiments—Encryption of Output From Graphics Card

In each of the above embodiments, while confidentiality and integrity has been demonstrated and described with respect to the dashed line portion of FIG. 2, confidentiality and integrity have not been demonstrated with respect to the video output, i.e., theoretically, the interface between the graphics card and the rendering device, such as a monitor, and/or the rendering device itself is subject to an attack.

Thus, in the above-described embodiments, as shown in FIG. 9A, at some point during the process, even though the content is protected in the video memory and during graphics card processing, the data is sent onto DVI/DAC 290 in the clear. As a result, the data may be pirated, or altered en route to the rendering device, and while inside the rendering device.

Thus, in accordance with an alternate embodiment of the invention, which may optionally be combined with other embodiments described herein, a sister crypto processor 220b is provided in the rendering device to complement the functionality performed by the crypto processor 220*a*. In this regard, encryption component 910*a* communicatively coupled to crypto processor 220*a* encrypts the data prior to delivery to DVI/DAC component 290 and decryption component 910*b* communicatively coupled to crypto processor 220*b* decrypts the data as part of the display or rendering that takes place, preventing piracy of the data. Encryption component 910*a* may alternately be included with DVI/DAC component 290. In short, applying the same encryption and decryption, and key management techniques, the content can be protected throughout the entire graphics pipeline for cryptographically protected secure delivery and processing of content.

As mentioned above, while exemplary embodiments of the present invention have been described in connection with various computing devices, hardware, software and network architectures, the underlying concepts may be applied to any computing device or system in which it is desirable to protect content from a trusted source. Thus, the techniques for cryptographically protecting secure content in accordance with the present invention may be applied to a variety of applications and devices. For instance, the methods for cryptographically protecting secure content of the invention may be applied to the operating system of a computing device, provided as a separate object on the device, as part of another object, as a downloadable object from a server, as a distributed object, etc. While exemplary programming languages, pseudocode, names and examples are chosen herein as representative of various choices, the languages, pseudocode, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the techniques of the present invention, e.g., through the use of a data processing API, operating system, trusted application or the like, are preferably implemented in a high level procedural or object oriented programming language to communicate with a computer system. However, the program(s) can be implemented in assembly or machine language, if desired. In any case, the language may be a compiled or interpreted language, and in various embodiments of the invention, imposes conditions upon hardware implementations of the GPU 265.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having a graphics card and encryption capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of co-processing chips or devices, such as a device having a plurality of GPUs, and storage may similarly be effected across a plurality of devices. Therefore, the present invention should not be limited to any single embodiment, but rather should be construed in breadth and scope in accordance with the appended claims.

Appendix A. Stream Ciphers Versus Block Ciphers

This Appendix details the differences between stream ciphers and block ciphers as they relate to the contents of this document.

| Issue | Stream cipher | Block cipher |
| --- | --- | --- |
| Granularity | Byte | 16-byte (128 bit) |
| Random access | Difficult/impossible | Straightforward |
| Key changes | Frequent (per frame) | Infrequent |
| Complexity | 1x | 4x stream cipher |
| IP Status | Proprietary | Public domain |

As a rule, stream ciphers are faster and simpler to implement than block ciphers.

As the name implies, stream ciphers encrypt and decrypt a stream of bytes. To decrypt the $N^{th}$ byte in the stream, the cipher starts at the beginning and advances one byte at a time to the desired offset into the stream.

In contrast, block ciphers that are running in electronic code book mode can encrypt or decrypt arbitrary blocks in the data, but must encrypt/decrypt a complete block at a time. A typical block size is 16 bytes.

Stream ciphers are used in such a way that the same data is never encrypted twice, i.e., the key used for encryption and decryption must be changed frequently. When used for premium video playback, for example, changing keys once per frame is sufficient.

As a final note, there are good quality block ciphers available in the public domain.

What is claimed is:

1. A method for cryptographically protecting secure content in connection with a trusted graphics system of a computing device, the trusted graphics system having video memory, at least one graphics processing unit (GPU) and a cryptographic processing device communicatively coupled to said at least one GPU, comprising:

requesting, by one of an application and device, the graphics system to perform one of processing and rendering of secure content, wherein said requesting includes transmitting by said one of an application and device a session key to the graphics system and transmitting said secure content to encrypted overlay surfaces which overlay at least one primary surface of said video memory, including a first encrypted confidential overlay for basic rendering of secure content and a second encrypted protected overlay specifically designed to present sensitive user interfaces, the second encrypted protected overlay being always-on-top and non-obscurable and the contents of the second encrypted protected overlay being verified by said at least one GPU;

decrypting the content of said at least one encrypted portion of video memory by said at least one GPU in communication with said cryptographic processing device, said decrypting including decrypting with a first stream cipher decryption component the contents of the first encrypted confidential overlay, and decrypting with a second stream cipher decryption component the contents of the second encrypted protected overlay;

performing said one of processing and rendering on said decrypted content by said at least one GPU; and outputting said content from the at least one GPU.

2. A method according to claim 1, wherein if the output of said outputting is different than the secure content of said requesting adjusted for any processing performed on said secure content by said at least one GPU, said one of an application and device is alerted to the difference.

3. A method according to claim 1, wherein said decrypting the content of said at least one encrypted portion of video memory includes decrypting a geometrical fraction of a primary surface, whereby pixels other than the geometrical fraction are not decrypted.

4. A method according to claim 1, wherein the cryptographic processor is permanently attached to the graphics card, by one of (A) adding the cryptographic processor to an existing chip and (B) adding the cryptographic processor as a separate chip to the graphics card, whereby the physical connection between the cryptographic processor and the rest of the graphics card is not accessible and is not exposed.

5. A method according to claim 1, wherein said decrypting includes decrypting said at least one encrypted overlay surface by a decryption mechanism of said GPU communicatively coupled to said cryptographic processing device.

6. A method according to claim 1, wherein said decrypting includes one of (A) decrypting said at least one encrypted overlay surface on the fly by digital to analog conversion (DAC) hardware of the graphics system as the content is output according to said outputting and (B) decrypting said at least one encrypted overlay surface on the fly just previous to the content reaching the DAC hardware of the graphics system.

7. A method according to claim 1, wherein said decrypting includes decrypting said at least one encrypted overlay surface previous to the content reaching the DAC hardware of the graphics system by a component having no back channel to the host system.

8. A method according to claim 1, farther including:
re-encrypting said content by said at least one GPU in communication with said cryptographic processing device prior to said outputting; and
decrypting said re-encrypted content by at least a second cryptographic processing device of an external computing device.

9. A method according to claim 8, wherein said external computing device is one of (A) a monitor, (B) a set top box and (C) a digital signal processing (DSP) rendering device.

10. A method according to claim 1, wherein the content is transmitted in digital form to an external device having a second cryptographic processing device and said decrypting occurs on said external device.

11. A method according to claim 1, wherein said decrypting includes calculating a cryptographic digest of the decrypted data, and said method farther includes:
transmitting said cryptographic digest to the one of an application and device to ensure that the displayed pixels are the pixels sent in connection with said requesting by the one of an application and device.

12. A method according to claim 1, wherein at least one bit of each pixel in a primary surface is used to determine membership in a virtual protected surface for the pixel, wherein the graphics card selects an appropriate decryption key for the pixel based on said at least one bit.

13. A method according to claim 12, wherein if said at least one bit contains a zero value, then the virtual protected surface associated with said at least one bit is interpreted as a region not to decrypt.

14. A method according to claim 1, further including once the decrypted pixel values are available, selecting by a pixel select component of said at least one GPU the pixel value of one of (A) the second encrypted protected overlay, (B) the first encrypted confidential overlay and (3) a primary surface.

15. A method according to claim 1, wherein said requesting includes at least one of (A) a source and destination bounding box of said at least one encrypted overlay surface, (B) a destination color key of said at least one encrypted overlay surface, (C) in the case of the first encrypted confidential overlay, a specification of an encryption key index of the contents of an overlay back buffer to which the data is to be flipped (D) in the case of the second encrypted protected overlay, a specification of a memory location where at least one of a cyclic redundancy code (CRC), an integrity measure and a digest value of the decrypted overlay contents are to be written, (L) a source and destination bounding box of at least one encrypted primary surface, and (F) a destination color key of said at least one encrypted primary surface.

16. A method according to claim 15, wherein said one of an application and device calculates said at least one of the CRC, integrity measure and digest value if said one of an application and device is concerned with integrity of the content.

17. A method according to claim 1, wherein at least one command buffer sent to a video decode unit of the at least one GPU incident to said requesting is encrypted by said at least one of an application and device and decrypted by said video decode unit in communication with said cryptographic processing unit.

18. A method according to claim 17, further comprising tamper detecting said at least one command buffer one of (A) by using two passes before consumption of the at least one command buffer and (B) after the command buffer has been consumed.

19. At least one computer readable medium comprising computer executable modules including computer executable instructions for cryptographically protecting secure content in connection with a trusted graphics system of a computing device, the trusted graphics system having video memory, at least one graphics processing unit (GPU) and a cryptographic processing device communicatively coupled to said at least one GPU, the computer executable modules comprising:
    means for requesting by one of an application and device the graphics system to perform one of processing and rendering of secure content, wherein said means for requesting includes means for transmitting by said one of an application and device a session key to the graphics system and means for transmitting said secure content to encrypted overlay surfaces which overlay at least one primary surface of said video memory, including a first encrypted confidential overlay for basic rendering of secure content and a second encrypted protected overlay specifically designed to present sensitive user interfaces, the second encrypted protected overlay being always-on-top and non-obscurable and the contents of the second encrypted protected overlay being verified by said at least one GPU;
    means for decrypting the content of said at least one encrypted portion of video memory by said at least one GPU in communication with said cryptographic processing device, said decrypting including decrypting with a first stream cipher decryption component the contents of the first encrypted confidential overlay, and decrypting with a second stream cipher decryption component the contents of the second encrypted protected overlay;
    means for performing said one of processing and rendering on said decrypted content by said at least one GPU; and
    means for outputting said content from the at least one GPU.

20. At least one computer readable medium according to claim 19, wherein if the output of said means for outputting is different than the secure content of said means for requesting adjusted for any processing performed on said secure content by said at least one GPU, said one of an application and device is alerted to the difference.

21. At least one computer readable medium according to claim 19, wherein said means for decrypting the content of said at least one encrypted portion of video memory includes means for decrypting a geometrical fraction of a primary surface, whereby pixels other than the geometrical fraction are not decrypted.

22. At least one computer readable medium according to claim 19, wherein the cryptographic processor is permanently attached to the graphics card, by one of (A) adding the cryptographic processor to an existing chip and (B) adding the cryptographic processor as a separate chip to the graphics card,
    whereby the physical connection between the cryptographic processor and the rest of the graphics card is not accessible and is not exposed.

23. At least one computer readable medium according to claim 19, wherein said means for decrypting includes means for decrypting said at least one encrypted overlay surface by a decryption mechanism of said GPU communicatively coupled to said cryptographic processing device.

24. At least one computer readable medium according to claim 19, wherein said means for decrypting includes one of (A) means for decrypting said at least one encrypted overlay surface on the fly by digital to analog conversion (DAC) hardware of the graphics system as the content is output according to said outputting of said means for outputting and (B) means for decrypting said at least one encrypted overlay surface on the fly just previous to the content reaching the DAC hardware of the graphics system.

25. At least one computer readable medium according to claim 19, wherein said means for decrypting includes means for decrypting said at least one encrypted overlay surface previous to the content reaching the DAC hardware of the graphics system by a component having no back channel to the host system.

26. At least one computer readable medium according to claim 19, further including:
    means for re-encrypting said content by said at least one GPU in communication with said cryptographic processing device prior to said outputting by said means for outputting; and
    means for decrypting said re-encrypted content by at least a second cryptographic processing device of an external computing device.

27. At least one computer readable medium according to claim 26, wherein said external computing device is one of (A) a monitor, (B) a set top box and (C) a digital signal processing (DSP) rendering device.

28. At least one computer readable medium according to claim 19, wherein the content is transmitted in digital form to an external device having a second cryptographic processing device and said decrypting of said means for decrypting occurs on said external device.

29. At least one computer readable medium according to claim 19, wherein said means for decrypting includes means for calculating a cryptographic digest of the decrypted data, and said computer executable modules further include:
    means for transmitting said cryptographic digest to the one of an application and device to ensure that the displayed pixels are the pixels sent in connection with said requesting by the one of an application and device via said means for requesting.

30. At least one computer readable medium according to claim 19, wherein at least one bit of each pixel in a primary surface is used to determine membership in a virtual protected surface for the pixel, wherein the graphics card selects an appropriate decryption key for the pixel based on said at least one bit.

31. At least one computer readable medium according to claim 30, wherein if said at least one bit contains a zero value, then the virtual protected surface associated with said at least one bit is interpreted as a region not to decrypt.

32. At least one computer readable medium according to claim 19, the computer executable modules further including, means for selecting, once the decrypted pixel values are available, by a pixel select component of said at least one GPU the pixel value of one of (A) the second encrypted protected overlay, (B) the first encrypted confidential overlay and (3) a primary surface.

33. At least one computer readable medium according to claim 19, wherein said requesting of said means for requesting includes at least one of (A) a source and destination bounding box of said at least one encrypted overlay surface, (B) a destination color key of said at least one encrypted overlay surface, (C) in the case of the first encrypted confidential overlay, a specification of an encryption key index of the contents of an overlay back buffer to which the data is to be flipped (D) in the case of the second encrypted protected overlay, a specification of a memory location where at least one of a cyclic redundancy code (CRC), an integrity measure and a digest value of the decrypted overlay contents are to be written, (L) a source and destination bounding box of at least one encrypted primary surface, and (F) a destination color key of said at least one encrypted primary surface.

34. At least one computer readable medium according to claim 33, wherein said one of an application and device calculates said at least one of the CRC, integrity measure and digest value if said one of an application and device is concerned with integrity of the content.

35. At least one computer readable medium according to claim 19, wherein at least one command buffer sent to a video decode unit of the at least one GPU incident to said requesting of said means for requesting is encrypted by said at least one of an application and device and decrypted by said video decode unit in communication with said cryptographic processing unit.

36. At least one computer readable medium according to claim 35, the computer executable modules further comprising means for tamper detecting said at least one command buffer one of (A) by using two passes before consumption of the at least one command buffer and (B) after the command buffer has been consumed.

37. A computing device comprising means for cryptographically protecting secure content in connection with a trusted graphics system of a computing device, the trusted graphics system having video memory, at least one graphics processing unit (GPU) and a cryptographic processing device communicatively coupled to said at least one GPU, comprising:
  means for requesting by one of an application and device the graphics system to perform one of processing and rendering of secure content, wherein said means for requesting includes means for transmitting by said one of an application and device a session key to the graphics system and means for transmitting said secure content to encrypted overlay surfaces which overlay at least one primary surface of said video memory, including a first encrypted confidential overlay for basic rendering of secure content and a second encrypted protected overlay specifically designed to present sensitive user interfaces, the second encrypted protected overlay being always-on-top and non-obscurable and the contents of the second encrypted protected overlay being verified by said at least one GPU;
  means for decrypting the content of said at least one encrypted portion of video memory by said at least one GPU in communication with said cryptographic processing device, said decrypting including decrypting with a first stream cipher decryption component the contents of the first encrypted confidential overlay, and decrypting with a second stream cipher decryption component the contents of the second encrypted protected overlay;
  means for performing said one of processing and rendering on said decrypted content by said at least one GPU; and
  means for outputting said content from the at least one GPU.

38. A computing device according to claim 37, wherein if the output of said means for outputting is different than the secure content of said means for requesting adjusted for any processing performed on said secure content by said at least one GPU, said one of an application and device is alerted to the difference.

39. A computing device according to claim 37, wherein said means for decrypting the content of said at least one encrypted portion of video memory includes means for decrypting a geometrical fraction of a primary surface, whereby pixels other than the geometrical fraction are not decrypted.

40. A computing device according to claim 37, wherein the cryptographic processor is permanently attached to the graphics card, by one of (A) adding the cryptographic processor to an existing chip and (B) adding the cryptographic processor as a separate chip to the graphics card,
  whereby the physical connection between the cryptographic processor and the rest of the graphics card is not accessible and is not exposed.

41. A computing device according to claim 37, wherein said means for decrypting includes means for decrypting said at least one encrypted overlay surface by a decryption mechanism of said GPU communicatively coupled to said cryptographic processing device.

42. A computing device according to claim 37, wherein said means for decrypting includes one of (A) means for decrypting said at least one encrypted overlay surface on the fly by digital to analog conversion (DAC) hardware of the graphics system as the content is output according to said outputting of said means for outputting and (B) means for decrypting said at least one encrypted overlay surface on the fly just previous to the content reaching the DAC hardware of the graphics system.

43. A computing device according to claim 37, wherein said means for decrypting includes means for decrypting said at least one encrypted overlay surface previous to the content reaching the DAC hardware of the graphics system by a component having no back channel to the host system.

44. A computing device according to claim 37, further including:
  means for re-encrypting said content by said at least one GPU in communication with said cryptographic processing device prior to said outputting by said means for outputting; and
  means for decrypting said re-encrypted content by at least a second cryptographic processing device of an external computing device.

45. A computing device according to claim 44, wherein said external computing device is one of (A) a monitor, (B) a set top box and (C) a digital signal processing (DSP) rendering device.

46. A computing device according to claim 37, wherein the content is transmitted in digital form to an external device having a second cryptographic processing device and said decrypting of said means for decrypting occurs on said external device.

47. A computing device according to claim 37, wherein said means for decrypting includes means for calculating a cryptographic digest of the decrypted data, and said computing device further includes:
  means for transmitting said cryptographic digest to the one of an application and device to ensure that the displayed pixels are the pixels sent in connection with said requesting by the one of an application and device via said means for requesting.

48. A computing device according to claim 37, wherein at least one bit of each pixel in a primary surface is used to determine membership in a virtual protected surface for the pixel, wherein the graphics card selects an appropriate decryption key for the pixel based on said at least one bit.

49. A computing device according to claim 48, wherein if said at least one bit contains a zero value, then the virtual protected surface associated with said at least one bit is interpreted as a region not to decrypt.

50. A computing device according to claim 37, further including, means for selecting, once the decrypted pixel values are available, by a pixel select component of said at least one GPU the pixel value of one of (A) the second encrypted protected overlay, (B) the first encrypted confidential overlay and (3) a primary surface.

51. A computing device according to claim 37, wherein said requesting of said means for requesting includes at least one of (A) a source and destination bounding box of said at least one encrypted overlay surface, (B) a destination color key of said at least one encrypted overlay surface, (C) in the case of the first encrypted confidential overlay, a specification of an encryption key index of the contents of an overlay back buffer to which the data is to be flipped (D) in the case of the second encrypted protected overlay, a specification of a memory location where at least one of a cyclic redundancy code (CRC), an integrity measure and a digest value of the decrypted overlay contents are to be written, (L) a source and destination bounding box of at least one encrypted primary surface, and (F) a destination color key of said at least one encrypted primary surface.

52. A computing device according to claim 51, wherein said one of an application and device calculates said at least one of the CRC, integrity measure and digest value if said one of an application and device is concerned with integrity of the content.

53. A computing device according to claim 37, wherein at least one command buffer sent to a video decode unit of the at least one GPU incident to said requesting of said means for requesting is encrypted by said at least one of an application and device and decrypted by said video decode unit in communication with said cryptographic processing unit.

54. A computing device according to claim 53, further comprising means for tamper detecting said at least one command buffer one of (A) by using two passes before consumption of the at least one command buffer and (B) after the command buffer has been consumed.

* * * * *